United States Patent
Kita et al.

[11] Patent Number: 5,849,431
[45] Date of Patent: Dec. 15, 1998

[54] HIGH CAPACITY SECONDARY BATTERY OF JELLY ROLL TYPE

[75] Inventors: Yosuke Kita, Kanagawa; Tatuo Shimizu, Fukushima; Satoshi Iwatsu, Kanagawa; Hideya Takahashi, Fukushima; Kiyoshi Katayama, Kanagawa, all of Japan

[73] Assignee: Sony Corporation, Tokyo, Japan

[21] Appl. No.: 719,440

[22] Filed: Sep. 25, 1996

[30] Foreign Application Priority Data

| Sep. 27, 1995 | [JP] | Japan | 7-249925 |
| Sep. 27, 1995 | [JP] | Japan | 7-249932 |
| Sep. 27, 1995 | [JP] | Japan | 7-249933 |
| Sep. 27, 1995 | [JP] | Japan | 7-249934 |

[51] Int. Cl.$^6$ .................................................. H01M 2/20
[52] U.S. Cl. .......................... 429/164; 429/170; 429/178; 429/233; 429/234
[58] Field of Search ................................ 429/94, 233, 234, 429/129, 133, 143, 147, 164, 170, 178

[56] References Cited

U.S. PATENT DOCUMENTS

| 4,053,687 | 10/1977 | Coibion et al. | |
| 4,237,199 | 12/1980 | Gelin | 429/94 |
| 4,283,843 | 8/1981 | Hooke | |
| 4,539,273 | 9/1985 | Goebel | 429/94 |
| 5,631,102 | 5/1997 | Spillman et al. | 429/94 |

FOREIGN PATENT DOCUMENTS

| 657519 | 4/1965 | Belgium . |
| 1.484.611 | 6/1967 | France . |
| WO 90/16089 | 12/1990 | WIPO . |

*Primary Examiner*—M. Nuzzolillo
*Attorney, Agent, or Firm*—Hill & Simpson

[57] ABSTRACT

A spirally coiled electrode assembly has positive and negative electrodes each including a web-like collector coated with an active material on opposite surfaces thereof, and separators disposed between the positive and negative electrodes. A plurality of rectangular leads extend from opposite sides of the web-like collectors in directions perpendicular to a direction in which the positive and negative electrodes and the separators are wound. Positive and negative terminals are connected to the rectangular leads extending from the respective opposite sides of the web-like collectors. The spirally coiled electrode assembly, the rectangular leads, and the positive and negative terminals are housed in a cylindrical casing whose opposite ends are closed by respective caps. The positive and negative terminals are fixed to the caps, respectively.

20 Claims, 16 Drawing Sheets

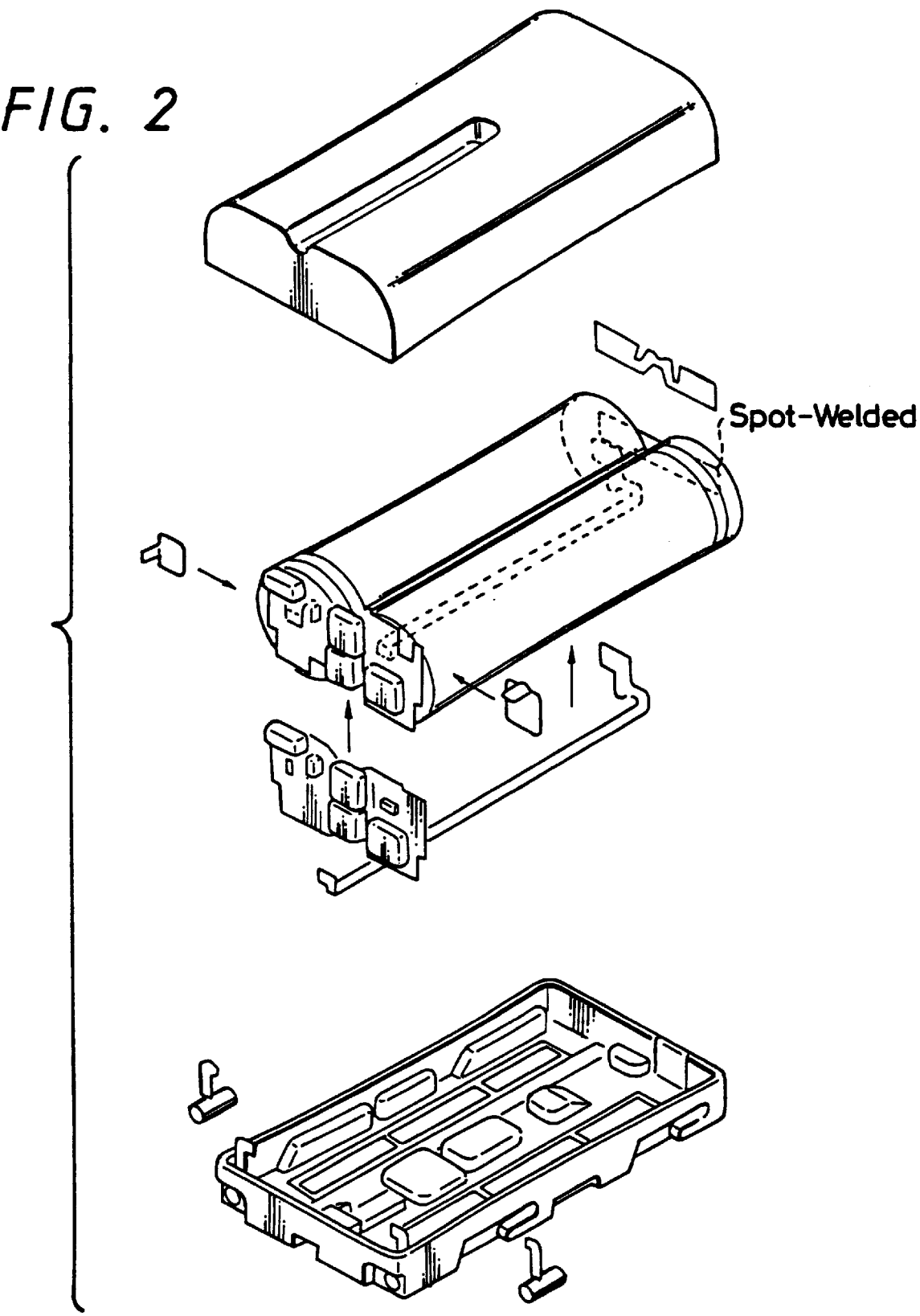

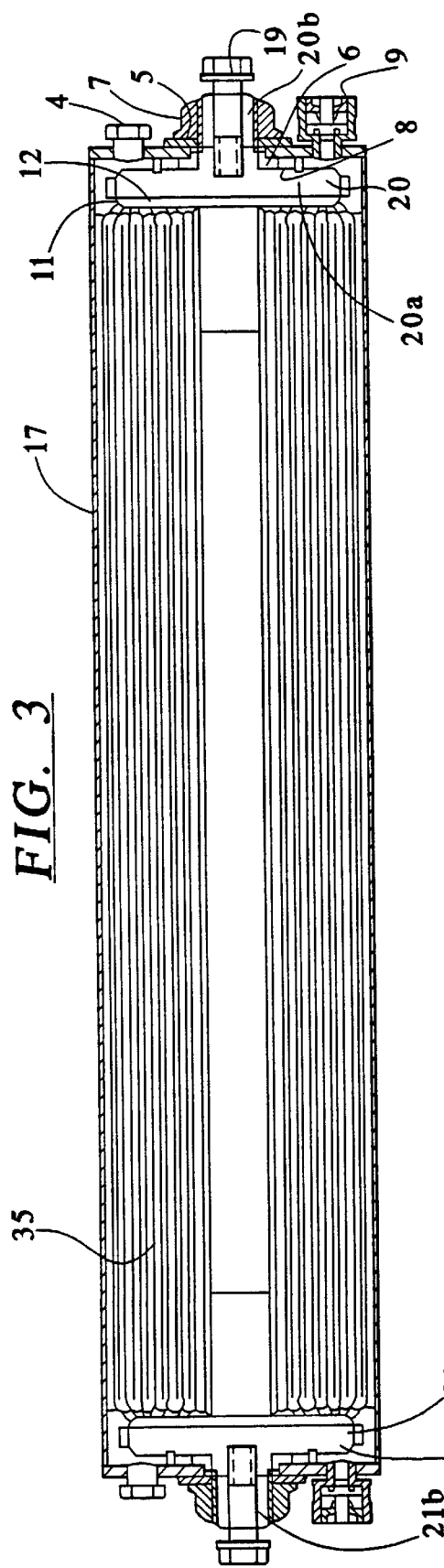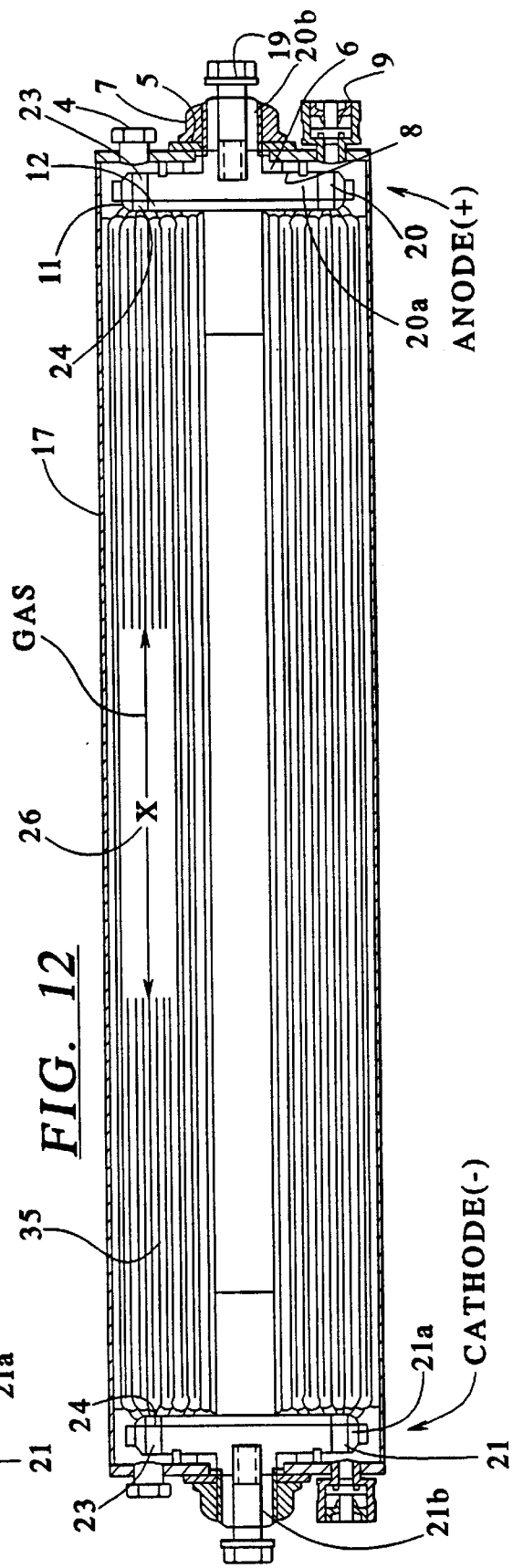

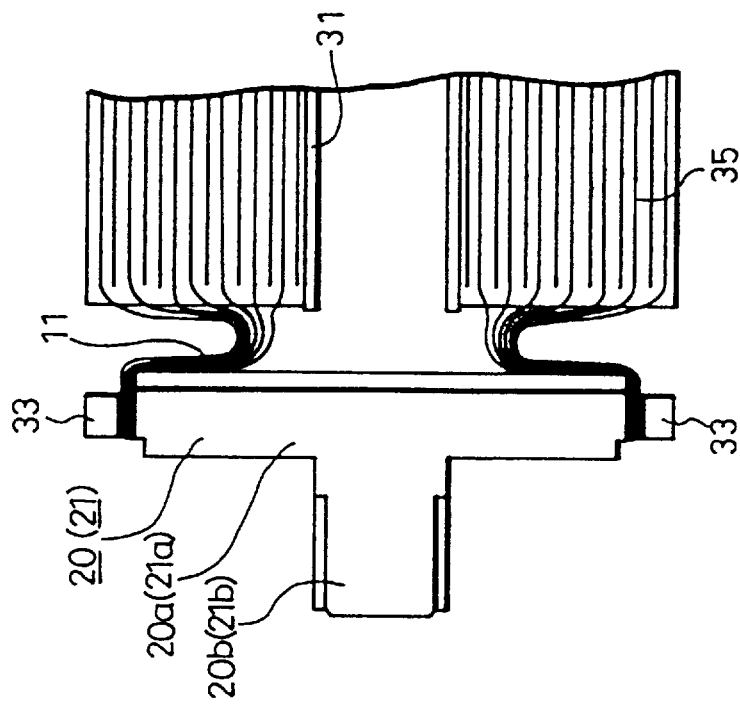
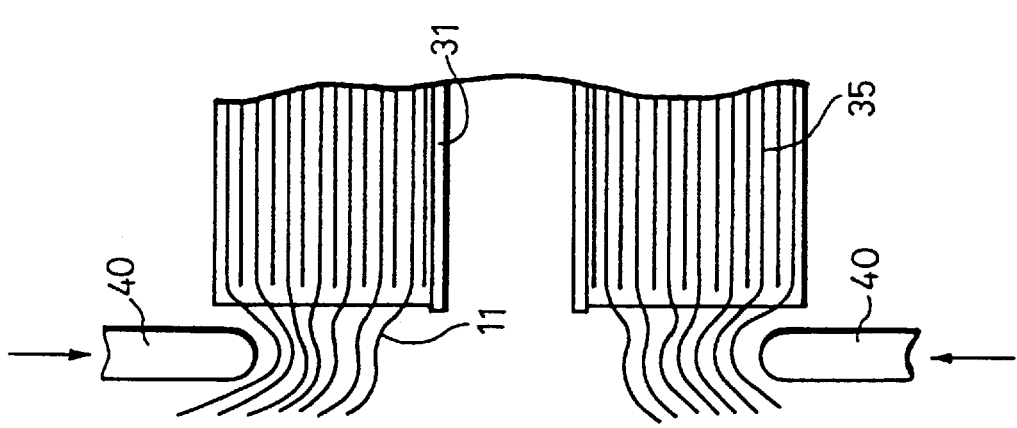

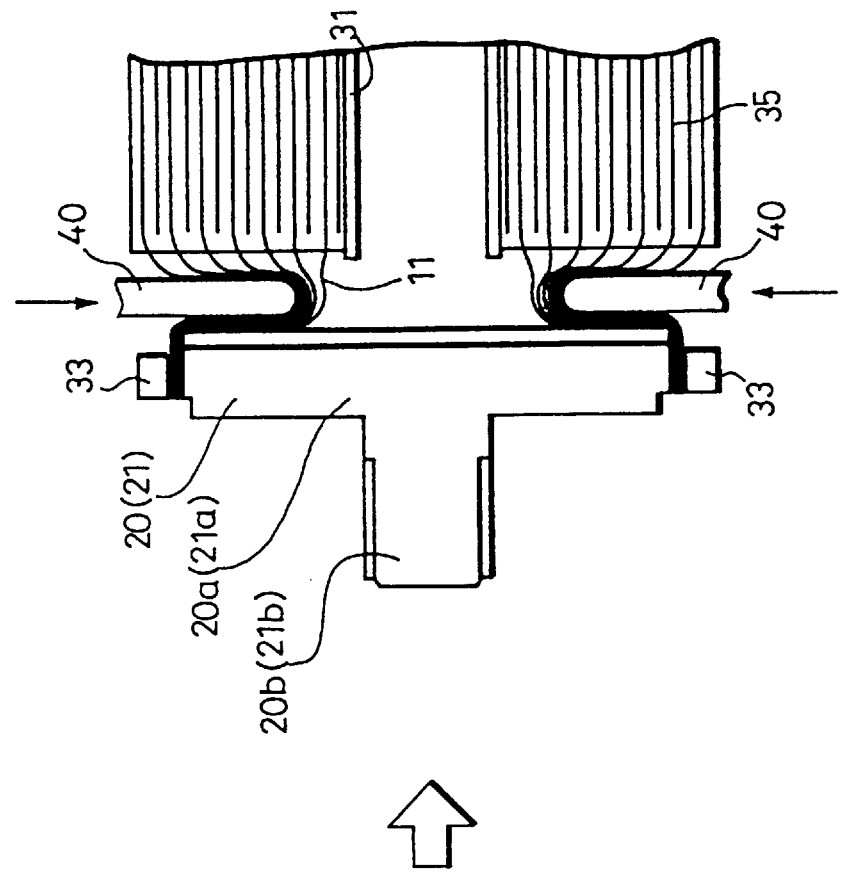
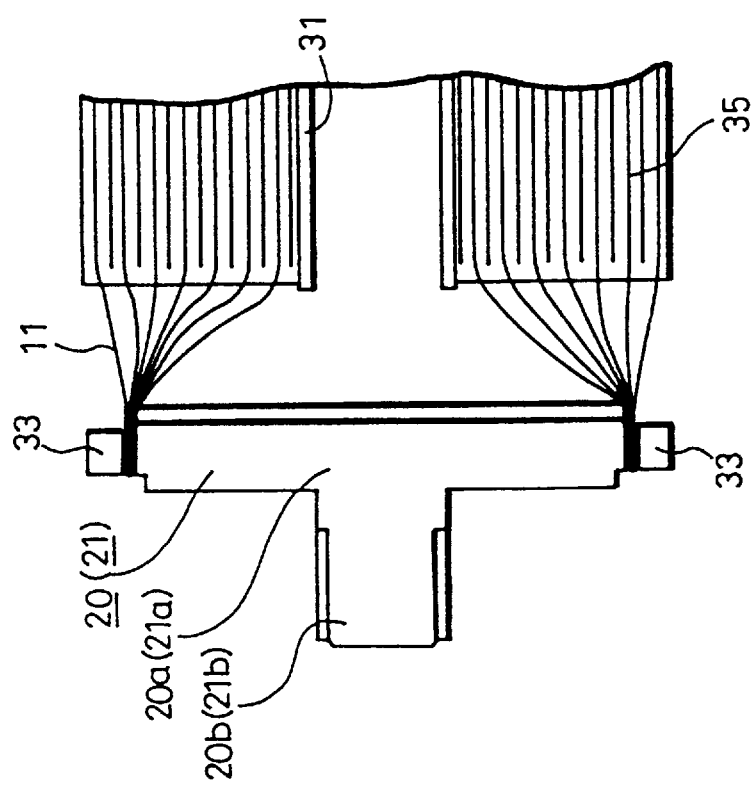
FIG. 10A
FIG. 10B

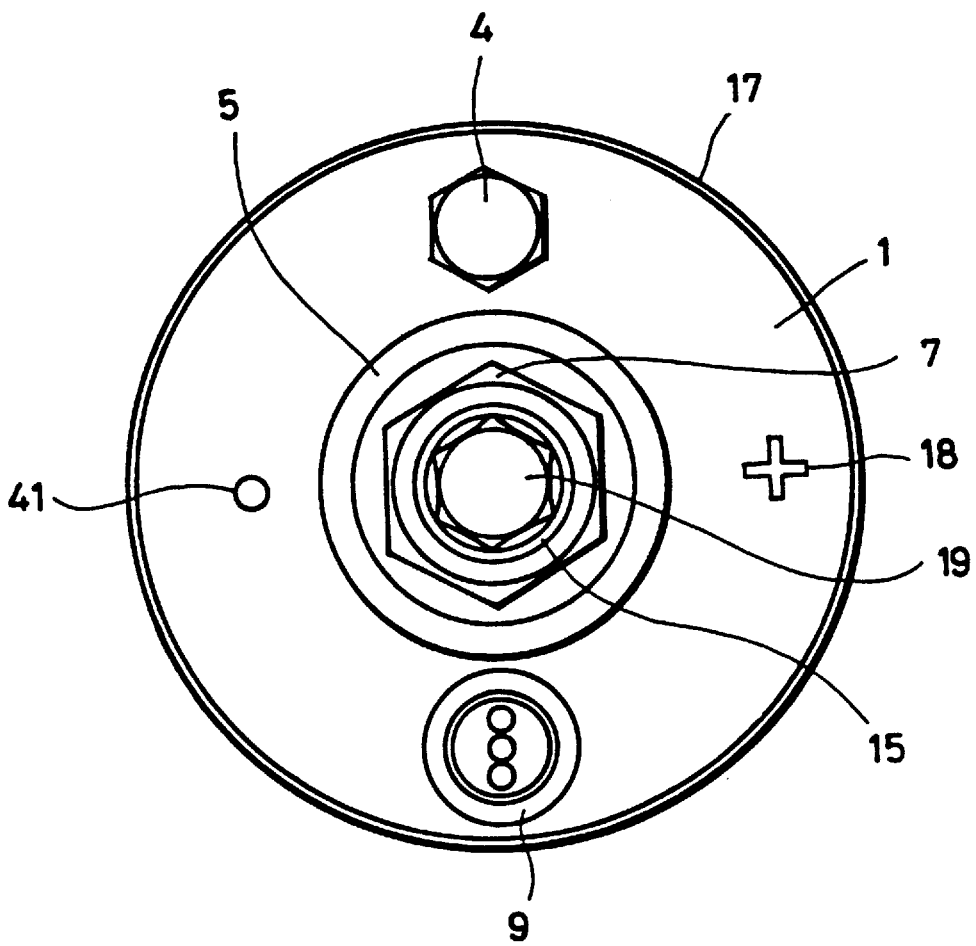

HIGH CAPACITY SECONDARY BATTERY OF JELLY ROLL TYPE

BACKGROUND OF THE INVENTION

1. Field of the Invention

The present invention relates to a secondary battery of the jelly roll type for use as a high-capacity battery as a power supply for an electric vehicle or the like.

2. Description of the Related Art

Cylindrical secondary batteries, which are typically for use as a power supply for electric vehicles, have a spirally coiled electrode assembly comprising a web-like positive electrode and a web-like negative electrode which are separated from each other by separators and wound in layers around a core, and a cylindrical case which accommodates the spirally coiled electrode assembly. The web-like positive electrode has a collector whose starting end is connected to the core, which may be made of aluminum, for example, and serves as a positive terminal or an anode. The web-like negative electrode has a collector whose terminal end is connected to the cylindrical case, which may be made of stainless steel, for example, and serves as a negative terminal or a cathode.

Since the starting and terminal ends of the collectors of the positive and negative electrodes are connected to the respective anode and cathode, electrons at ends of the positive and negative electrodes are required to travel long distances to the opposite ends, with the result that the cylindrical secondary batteries have a relatively large internal resistance. If the cylindrical secondary batteries are larger in size, then since the positive and negative electrodes are longer, the internal resistance of the cylindrical secondary batteries is greater.

One solution would be to increase the cross-sectional area of each of the positive and negative electrodes for thereby reducing the internal resistance. However, the increased cross-sectional area of each of the positive and negative electrodes results in an increase in the thickness of each of the positive and negative electrodes.

According to another solution, leads are attached to the collectors, which may be made of metal foil, of the positive and negative electrodes in respective opposite directions perpendicular to the direction in which the positive and negative electrodes are wound. However, inasmuch as the cylindrical secondary batteries for use as a power supply for electric vehicles are large in size and the spirally coiled electrode assembly is heavy and subject to vibration, the leads tend to be broken in use.

When a cylindrical secondary battery which contains a nonaqueous electrolyte suffers a failure due to a short circuit between electrodes, for example, the nonaqueous electrolyte is evaporated into a gas due to the Joule heat which is generated by the short circuit. The generated gas is apt to escape axially, rather than spirally, along the positive and negative electrodes, because the spiral passage along the positive and negative electrodes is long and poses a greater resistance to the flow of the gas.

Small-size cylindrical secondary batteries rated at 1~5 Ah have a relatively small number of leads and the leads have a relatively small cross-sectional area because currents flowing through the leads are relatively small.

In larger cylindrical secondary batteries, however, a rated current flowing through the leads is greater and the Joule heat produced by the leads is proportional to the square of the current. Therefore, the number and cross-sectional area of leads which are used are required to be larger in a manner that is commensurate with the amount of produced Joule heat (which is proportional to the square of the current).

If the leads are formed as an extension of the foil collectors of the positive and negative electrodes, then the number of leads used in the secondary batteries rated at 20 Ah or more have to be increased because the foil collectors themselves are relatively thin, e.g., 10 to 40 $\mu$m thin.

Anode and cathode studs, or terminal studs, which are connected to the leads for transmitting the current are surrounded by the many leads, failing to provide outlets for a gas which may be generated in the secondary battery.

FIG. 1 of the accompanying drawings shows a typical cylindrical secondary battery having a spirally coiled electrode assembly of web-like positive and negative electrodes which are separated from each other by separators. If the illustrated cylindrical secondary battery is rate at 5 Ah or less for use as a power supply for an audio/visual electronic device, for example, then since the rated current is relatively small, the secondary battery may be connected to external wires through a relatively small area of contact. Consequently, no mechanically rugged structure is necessary for coupling the secondary battery to the external wires. Instead, it has been customary to connect the external wires to the secondary battery with conductors in the form of springs, e.g., leaf or rolled springs, that are resiliently held in contact with the anode and cathode of the secondary battery. Alternatively, tabs for connection to the external wires are spot-welded to the anode and cathode of the secondary battery, as shown in FIG. 2 of the accompanying drawings.

Conductors or bus bars for connection to secondary batteries having a large storage capacity, for use as a power supply for electric vehicles, for example, have to be thick in order to carry large currents. Unless the areas of the conductors or bus bars which are held in contact with the terminals of the secondary batteries are sufficiently rigid and large, they tend to suffer a contact failure and generate heat at a region where the electric resistance is high. One widely used way of securely connecting the conductors or bus bars to the secondary batteries has been to employ bolts to fasten the conductors or bus bars to the terminals of the secondary batteries.

However, when the bolts are tightened, care should be taken to protect seals of the secondary batteries from damage due to tightening torques being applied. Furthermore, if the terminal studs are rotated in unison with the bolts, then a structural body in the secondary battery is twisted, causing an internal short circuit.

SUMMARY OF THE INVENTION

It is therefore an object of the present invention to provide a secondary battery which has a relatively small internal resistance while at the same time having relatively thin collectors of positive and negative electrodes.

Another object of the present invention is to provide a secondary battery which has leads prevented from being broken even if the secondary battery is large in size.

Still another object of the present invention is to provide a secondary battery which has means for quickly and smoothly guiding a gas generated in the secondary battery to an inlet of a gas release valve.

Yet still another object of the present invention is to provide a secondary battery which prevents terminal studs from rotating in unison with bolts used to fasten conductors or bus bars, for preventing leads from moving or being damaged when external wires are connected to the secondary battery, and also for protecting seals of the secondary battery from damage.

According to the present invention, there is provided a cylindrical secondary battery comprising a spirally coiled electrode assembly having positive and negative electrodes each including a web-like collector coated with an active material on opposite surfaces thereof, and separators disposed between the positive and negative electrodes, a plurality of rectangular leads extending from opposite sides of the web-like collectors in directions extending perpendicular to a direction in which the positive and negative electrodes and the separators are wound, positive and negative terminals connected to the rectangular leads extending from the respective opposite sides of the web-like collectors, a cylindrical casing housing the spirally coiled electrode assembly, the rectangular leads, and the positive and negative terminals, and a pair of caps being mounted on respective opposite ends of the cylindrical casing with the positive and negative terminals being fixed to the caps, respectively.

According to the present invention, there is also provided a cylindrical secondary battery comprising a spirally coiled electrode assembly having positive and negative electrodes each including a web-like collector coated with an active material on opposite surfaces thereof, and separators disposed between the positive and negative electrodes, a plurality of leads extending from opposite sides of the web-like collectors in directions extending perpendicular to a direction in which the positive and negative electrodes and the separators are wound, the rectangular leads having a loosened portion, positive and negative terminals connected to the leads extending from the respective opposite sides of the web-like collectors, a cylindrical casing housing the spirally coiled electrode assembly, the leads, and the positive and negative terminals, and a pair of caps being mounted on respective opposite ends of the cylindrical casing with the positive and negative terminals being fixed to the caps, respectively.

According to the present invention, there is further provided a cylindrical secondary battery comprising a spirally coiled electrode assembly having positive and negative electrodes each including a coated active material, separators disposed between the positive and negative electrodes, and a core, the positive and negative electrodes and the separators being wound around the core, a plurality of leads extending from uncoated areas of the positive and negative electrodes along full lengths thereof, positive and negative terminals having respective disks each having gas release holes, the leads being welded to outer circumferential surfaces of the disks substantially fully therealong, and insulating collars electrically insulating the core from the disks and having gas release holes contiguous to the gas release holes defined in the disks.

According to the present invention, there is also provided a cylindrical secondary battery comprising a terminal having a disk and a stud projecting axially from the disk, the disk having an off-center hole defined therein, the stud having an externally threaded surface and an internally threaded central hole, a cap fastened between the disk and a nut which is threaded over the externally threaded surface, a bolt threaded into the internally threaded central hole for sandwiching a conductor between a head of the bolt and an end of the stud, a stopper pin having an end portion fixed to the cap and an opposite end portion fitted in the off-center hole in the disk, and an insulating collar fitted over the opposite end portion of the stopper pin for electrically insulating the cap from the disk.

According to the present invention, there is further provided a cylindrical secondary battery comprising a spirally coiled electrode assembly having positive and negative electrodes each including a web-like collector coated with an active material on opposite surfaces thereof, and separators disposed between the positive and negative electrodes, a plurality of leads extending from opposite sides of the web-like collectors in directions extending perpendicular to a direction in which the positive and negative electrodes and the separators are wound, positive and negative terminals connected to the leads extending from the respective opposite sides of the web-like collectors, a cylindrical casing housing the spirally coiled electrode assembly, the leads, and the positive and negative terminals, a pair of caps being mounted on respective opposite ends of the cylindrical casing, the positive and negative terminals being fixed to the caps, respectively, each of the positive and negative terminals having a disk and a stud projecting axially from the disk, the disk having an off-center hole defined therein, the stud having an externally threaded surface and an internally threaded central hole, each of the caps being fastened between the disk and a nut which is threaded over the externally threaded surface, a bolt threaded into the internally threaded central hole for sandwiching a conductor between a head of the bolt and an end of the stud, a stopper pin having an end portion fixed to each of the caps and an opposite end portion fitted in the off-center hole in the disk, and an insulating collar fitted over the opposite end portion of the stopper pin for electrically insulating the cap from the disk.

BRIEF DESCRIPTION OF THE DRAWINGS

FIG. 2 is an exploded perspective view of another conventional cylindrical secondary battery;

FIG. 3 is a longitudinal cross-sectional view of a cylindrical secondary battery according to an embodiment of the present invention;

FIGS. 9A and 9B are partial cross-sectional views showing still another process of connecting leads at one end to a terminal disk;

FIGS. 10A and 10B are partial cross-sectional views showing yet still another process of connecting leads at one end to a terminal disk;

FIG. 11 is an enlarged elevational view of an end of the cylindrical secondary battery shown in FIG. 3;

FIG. 12 is a longitudinal cross-sectional view of a cylindrical secondary battery according to another embodiment of the present invention;

DETAILED DESCRIPTION OF THE PREFERRED EMBODIMENTS

Figure 1:
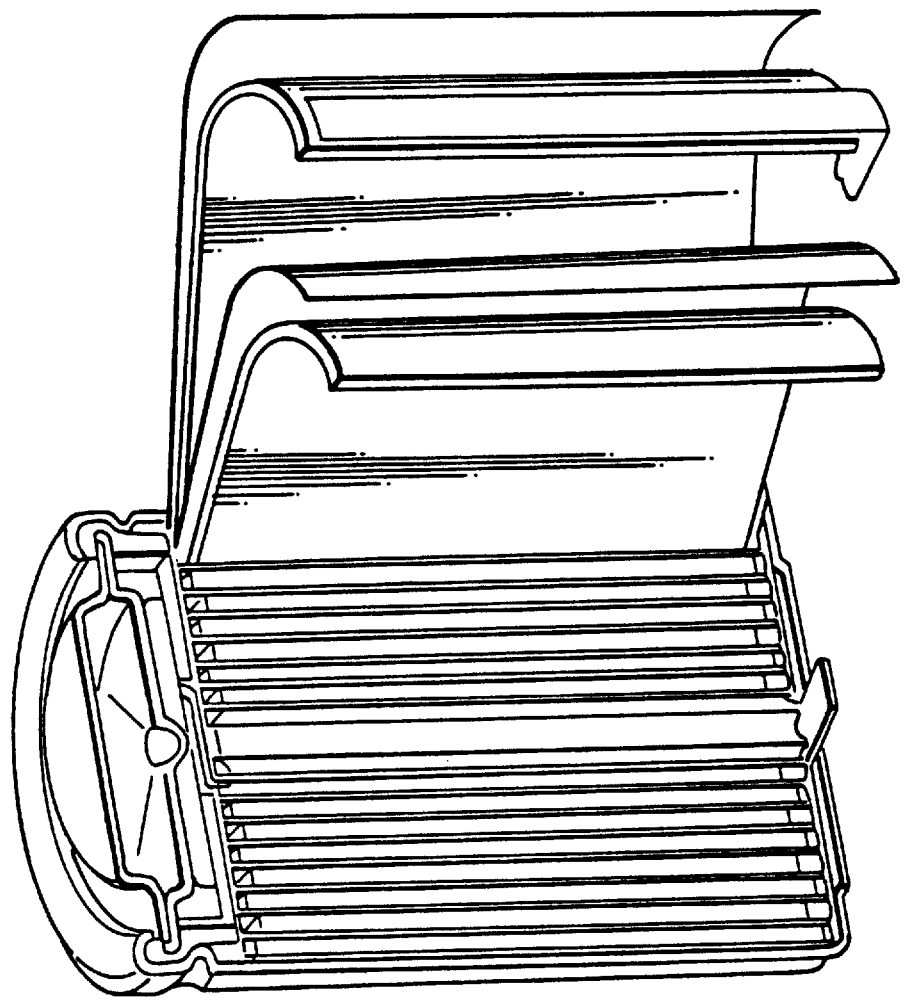
FIG. 1 is a fragmentary perspective view of an internal structure of a conventional cylindrical secondary battery.

Like or corresponding parts are denoted by like or corresponding reference characters throughout views.

FIG. 3 shows a cylindrical secondary battery according to an embodiment of the present invention, which is embodied as a cylindrical lithium ion secondary battery that may also be referred to as a nonaqueous secondary battery of the jelly roll type.

Figure 4:
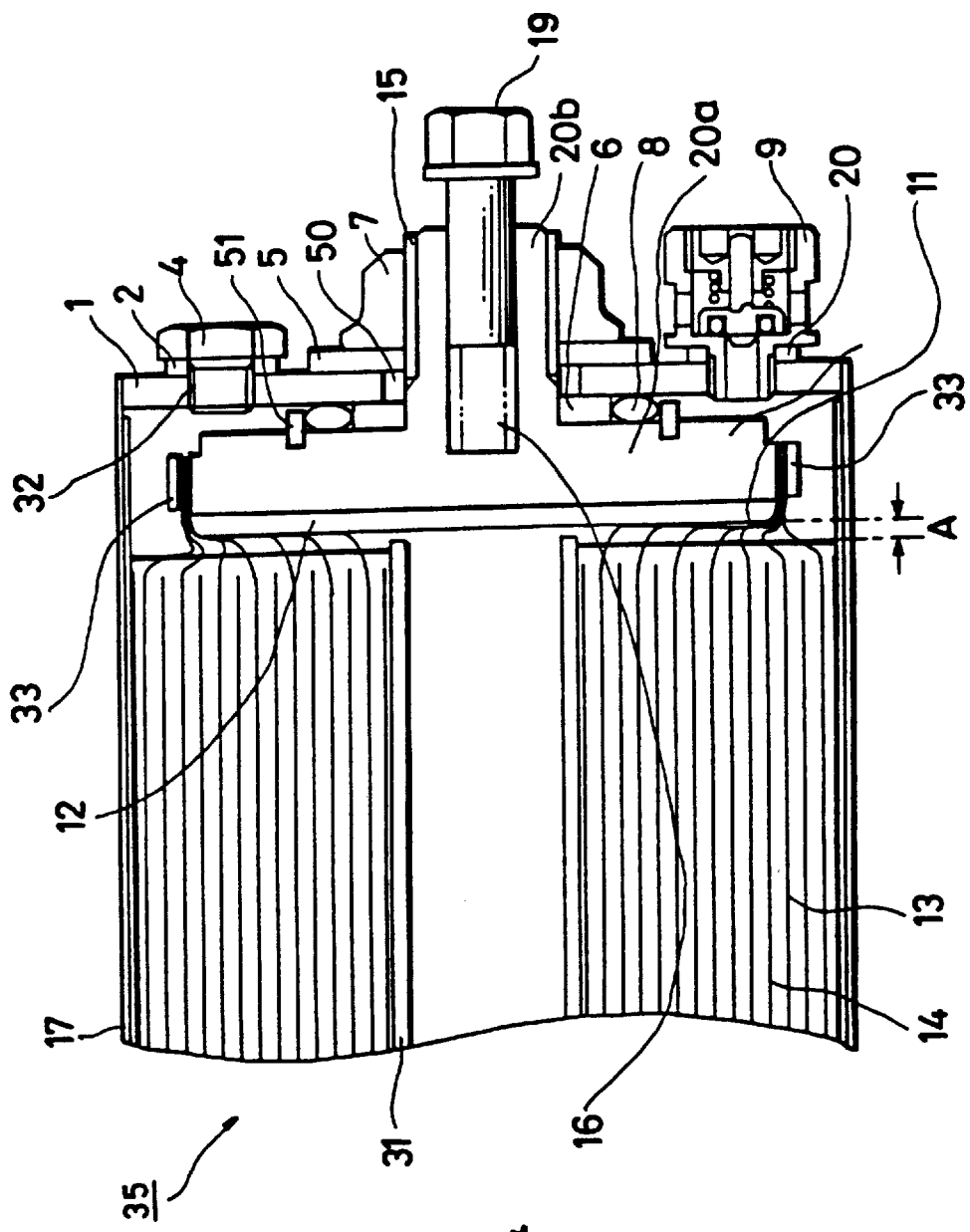
FIG. 4 is an enlarged partial cross-sectional view of one end of the cylindrical secondary battery shown in FIG. 3.
Figure 5:
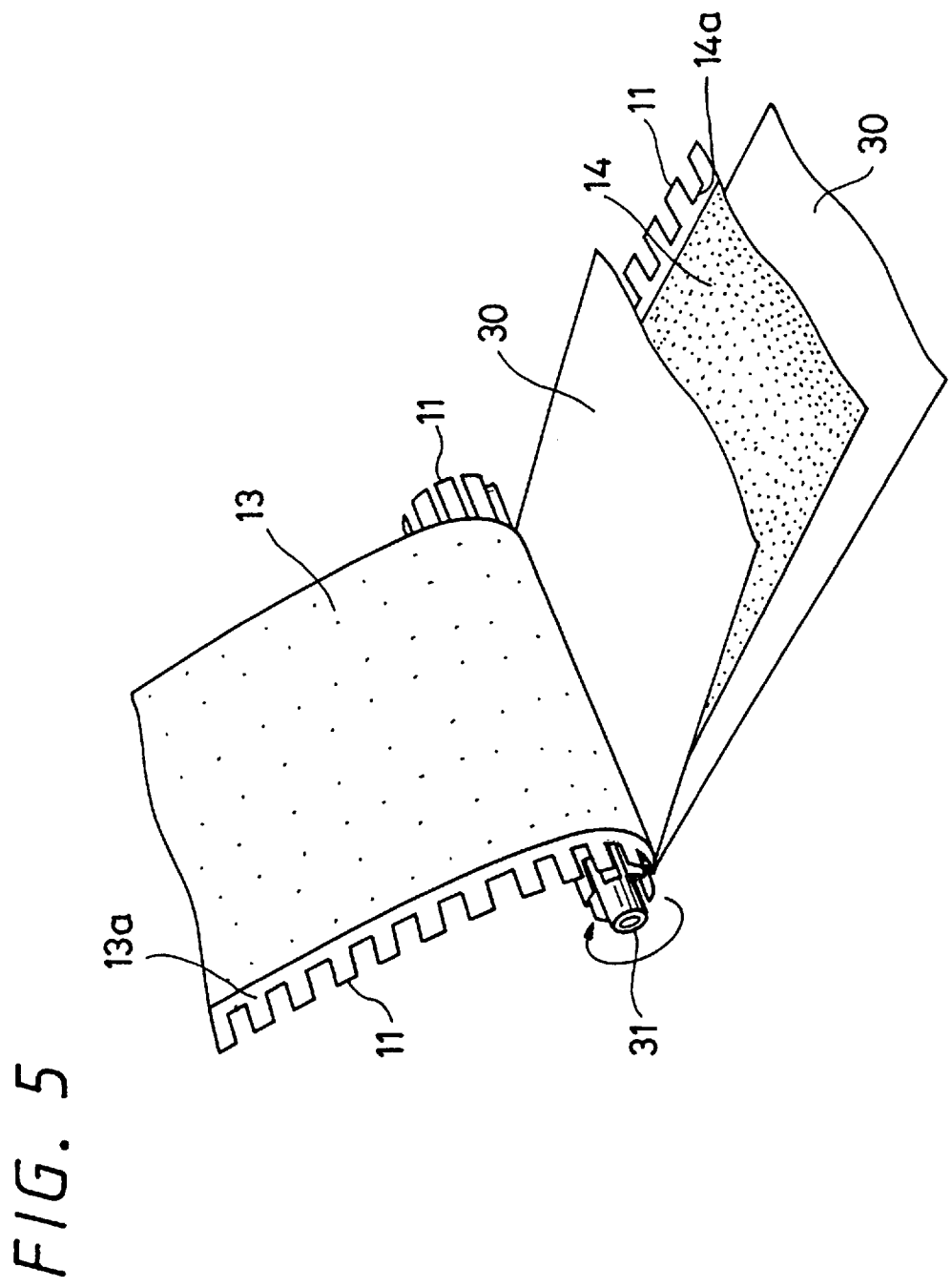
FIG. 5 is a fragmentary perspective view showing how positive and negative electrodes and separators are wound around a core of the cylindrical secondary battery shown in FIG. 3.

As shown in FIG. 3, the cylindrical secondary battery comprises a cylindrical case 17 and a spirally coiled electrode assembly 35 housed in the cylindrical case 17. As shown in FIGS. 4 and 5, the spirally coiled electrode assembly 35 comprises a web-like positive electrode 13 and a web-like negative electrode 14 which are separated from each other by separators 30 and are wound with the separators 30 in layers around a core 31.

The negative electrode 14 is manufactured as follows:

An active material of the negative electrode 14 is produced from a starting material of petroleum pitch 10 to 20% of a functional group including oxygen is introduced into the petroleum pitch, i.e., the petroleum pitch is crosslinked by oxygen. Thereafter, the oxygen-crosslinked petroleum pitch is heated at 1000° C. in an inactive gas flow, producing a carbon material whose properties are close to those of glassy carbon. The carbon material is then crushed into a carbon material powder whose particles have an average diameter of 20 $\mu$m.

Figure 6A:
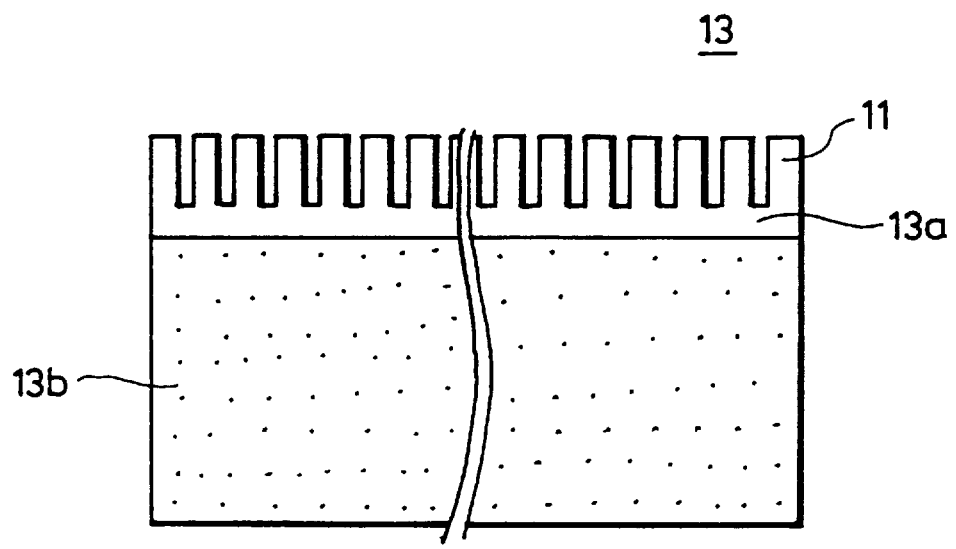
FIGS. 6A and 6B are plan view of the positive and negative electrodes of the cylindrical secondary battery shown in FIG. 3.
Figure 6B:
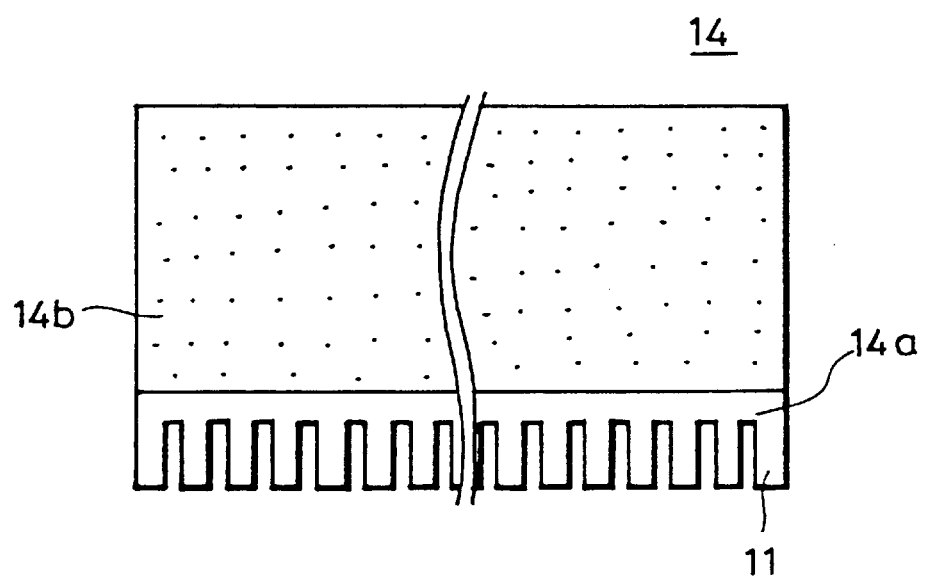

90 parts by weight of the carbon material powder and 10 parts by weight of a binder of polyvinylidene fluoride (PVDF) are mixed with each other, and the resultant mixture is dispersed in a solvent of N-methylpyrrolidone, producing a slurry-like active material for the negative electrode 14. As shown in FIG. 6B, the slurry-like active material, denoted at 14$b$, is uniformly coated on both surfaces of a negative electrode collector 14$a$ which comprises a web-like copper foil having a thickness of 10 $\mu$m, producing a negative electrode blank having a thickness of 180 $\mu$m. The negative electrode blank is then cut into the negative electrode 14, leaving an uncoated area on one side for use as leads. The negative electrode 14 thus manufactured has a width of 383 mm including a coated area having a width of 348 mm and an uncoated area having a width of 35 mm, and a length of 6940 mm.

The positive electrode 13 is manufactured as follows:

91 parts by weight of a powder of LiCoO$_2$ having an average diameter of 15 $\mu$m, 6 parts by weight of an electric conductor of graphite, and 3 parts by weight of a binder of polyvinylidene fluoride are mixed with each other, and the resultant mixture is dispersed in a solvent of N-methylpyrrolidone, producing a slurry-like active material for the positive electrode 13. As shown in FIG. 6A, the slurry-like active material, denoted at 13$b$, is uniformly coated on both surfaces of a positive electrode collector 13$a$ which comprises a web-like aluminum foil having a thickness of 20 $\mu$m, producing a positive electrode blank having a thickness of 150 $\mu$m. The positive electrode blank is then cut into the positive electrode 13, leaving an uncoated area on one side for use as leads. The positive electrode 13 thus manufactured has a width of 379 mm including a coated having a width of 344 mm and an uncoated area having a width of 35 mm, and a length of 7150 mm.

After the active materials 13$b$, 14$b$ have been coated on the positive and negative collectors 13$a$, 14$a$, respectively, the positive and negative electrodes 13, 14 should not be cut off transversely thereacross to prevent the coated active materials 13$b$, 14$b$ from falling off the positive and negative collectors 13$a$, 14$a$ and hence prevent the occurrence of an internal short circuit which would otherwise be caused if the coated active materials 13$b$, 14$b$ fell off.

Then, uncoated areas of the positive and negative electrodes 13, 14 are cut fully along their entire length into rectangular teeth each having a width of 10 mm and a length of 30 mm and the teeth are spaced at a pitch or interval of 15 mm. The teeth serve as rectangular leads 11 which extend transversely from one side of the positive and negative electrodes 13, 14.

The rectangular leads 11 are required to be longer than the distances from corresponds sides of the positive and negative electrodes 13, 14 to a positive terminal (anode) 20 and a negative terminal (cathode) 21 (see FIG. 3), respectively. The width of the rectangular leads 11 is selected such that the entire cross-sectional area of the rectangular leads 11 will allow a maximum current to flow therethrough. The width of the rectangular leads 11 should preferably be of 10 mm or smaller in view of their being bent. Each of the rectangular leads 11 has a proximal end having round corners each having a radius of curvature of 1 mm, for example, to make the rectangular leads 11 resistant to being torn off.

As shown in FIG. 5, the positive electrode 13, a separator 30, the negative electrode 14, and another separator 30 are successively superposed in the order named, and wound around the core 31, thereby producing the spirally coiled electrode assembly 35. The rectangular leads 11 of the positive and negative electrodes 13, 14 are oriented axially opposite to each other such that the rectangular leads 11 of the positive electrode 13 will be positioned at one end of the spirally coiled electrode assembly 35 and the rectangular leads 11 of the negative electrode 14 will be positioned at the opposite end of the spirally coiled electrode assembly 35.

Each of the separators 30 comprises a sheet of polyethylene having a thickness of 38 $\mu$m and a size of 353×7600 mm and perforated with minute holes.

The core 31 comprises a hollow cylinder of pure aluminum having an outside diameter of 17 mm, an inside diameter of 14 mm, and a length of 354 mm, for example.

The rectangular leads 11 which extend on both axial ends of the core 31 allow a current produced from the electrode collectors 13$a$, 13$a$ to be well extracted from the secondary battery. The rectangular leads 11 which are relatively slender are easily deformable to from connections to the positive and negative terminals 20; 21.

As shown in FIG. 3, the positive and negative terminals 20, 21 comprise respective disks 20$a$, 21$a$ and respective cylindrical studs 20b, 21b projecting axially outwardly from respective central portions of the disks 20a, 21a.

After the positive and negative electrodes 13, 14 and the separators 30 have been wound around the core 31, the rectangular leads 11 are pressed at substantially equal intervals against outer circumferential surfaces of the disks 20a, 21a of the positive and negative terminals 20, 21 by respective holders 33, as shown in FIG. 4. Though only the positive terminal 20 and the rectangular leads 11 pressed thereagainst by the holder 33 are shown in FIG. 4, the rectangular leads 11 are pressed against the negative terminal 21 by the holder 33 in the same manner as shown in FIG. 4.

The positive terminal 20 is made of pure aluminum (A1050), and the negative terminal 21 is made of pure copper (C1100). The holder 33 on the positive terminal 20 is made of pure aluminum (A1050), and the holder 33 on the negative terminal 21 is made of pure copper (C1100).

Figure 7:
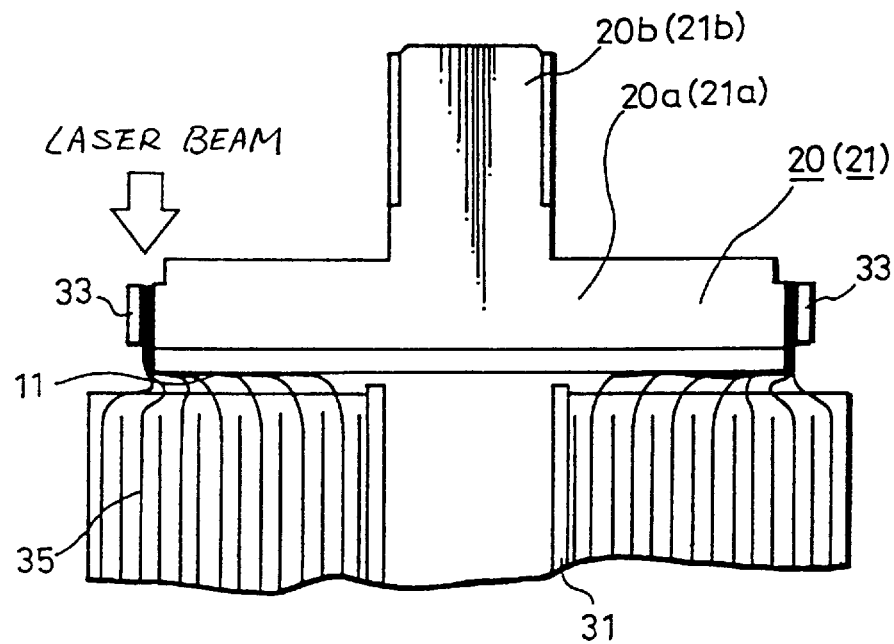
FIG. 7 is a partial cross-sectional view showing a process of connecting leads at one end to a terminal disk.

After the rectangular leads 11 have been pressed against the outer circumferential surfaces of the disks 20a, 21a of the positive and negative terminals 20, 21 by the respective holders 33, the outer ends of the rectangular leads 11 are cut off along outer end surfaces of the disks 20a, 21b. Thereafter, as shown in FIG. 7, a laser beam which is directed toward the outer surfaces of the disks 20a, 21a is applied to the ends of the rectangular leads 11 which are pressed against the outer circumferential surfaces of the disks 20a, 21a by the holders 33, thereby welding the rectangular leads 11 to the outer circumferential surfaces of the disks 20a, 21a.

Since the rectangular leads 11 extending from the electrode collectors 13a, 14a are joined to the positive and negative terminals 20, 21 by welding through a wide area over the outer circumferential surfaces of the disks 20a, 21a, the internal resistance across the junction between the rectangular leads 11 and the positive and negative terminals 20, 21 is small and does not suffer variations among different secondary batteries. Because the rectangular leads 11 and the positive and negative terminals 20, 21 are joined to each other through a wide area, the secondary battery has an excellent capability to discharge large currents.

The rectangular leads 11 are positioned at uniform intervals around the disks 20a, 21a of the positive and negative terminals 20, 21. Therefore, the distance from the positive and negative electrode collectors 13a, 14a to the positive and negative terminals 20, 21 is relatively small, resulting in a relatively small internal resistance. Therefore, even if the secondary battery is of a relatively large size and hence a relatively large storage capacity, the positive and negative electrode collectors 13a, 14a are not required to be relatively large in thickness. As a result, the positive and negative electrode collectors 13a, 14a may be relatively small in size.

Figure 8:
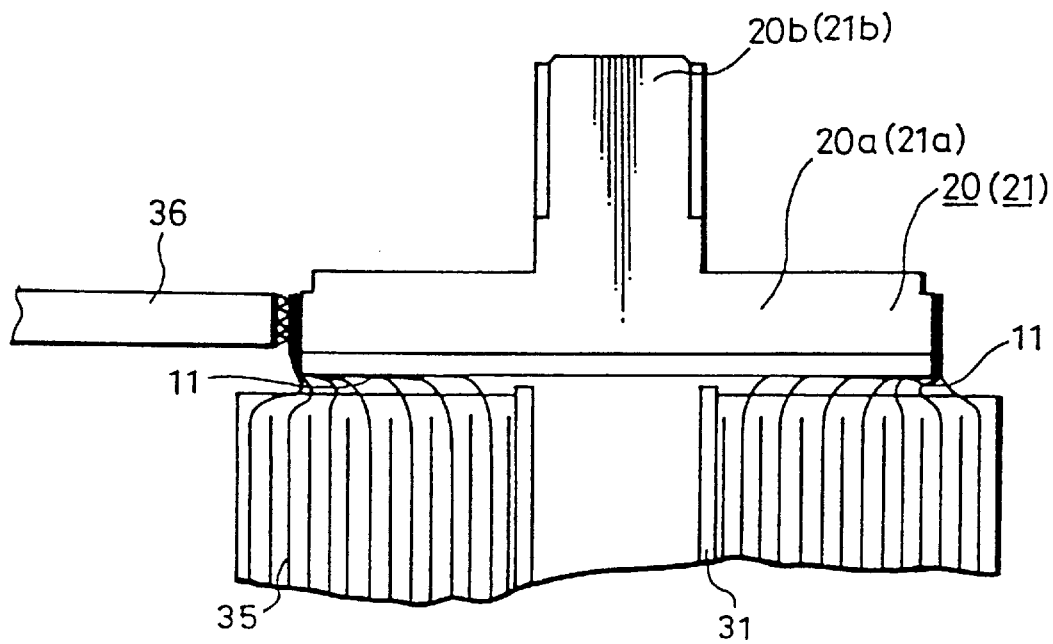
FIG. 8 is a partial cross-sectional view showing another process of connecting leads at one end to a terminal disk.
Figure 13:
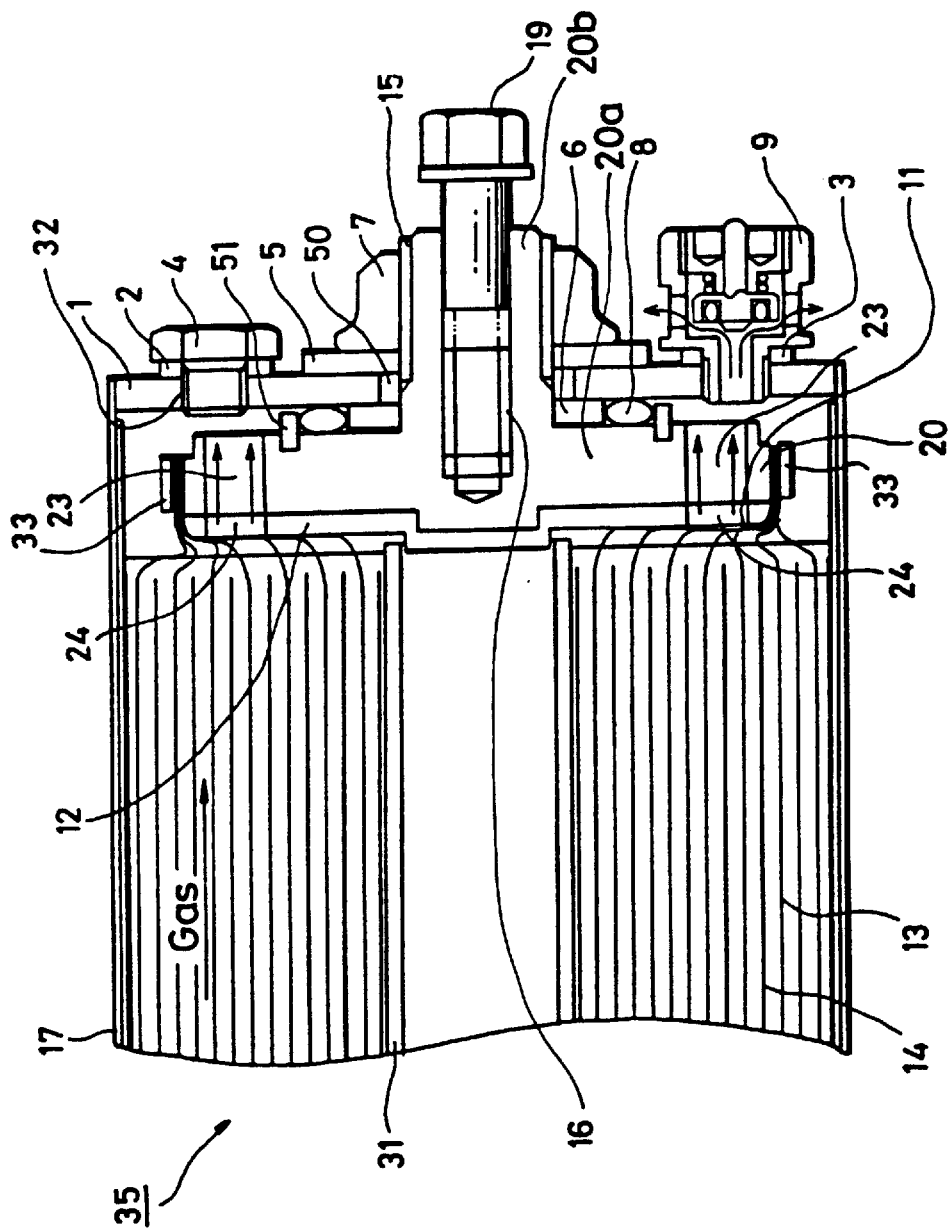
FIG. 13 is an enlarged partial cross-sectional view of one end of the cylindrical secondary battery shown in FIG. 12.

The rectangular leads 11 may be ultrasonically welded to the outer circumferential surfaces of the disks 20a, 21a. Specifically, as shown in FIG. 8, the rectangular leads 11 are positioned at substantially equal intervals against the outer circumferential surfaces of the disks 20a, 21a, and then a disk-shaped horn 36 of an ultrasonic welding machine is held against the ends of the rectangular leads 11 on the outer circumferential surfaces of the disks 20a, 21a and energized to ultrasonically weld the rectangular leads 11 to the outer circumferential surfaces of the disks 20a, 21a.

The rectangular leads 11 are pressed against the disks 20, 21 such that the portions thereof which extend between the positive and negative electrodes 13, 14 and the disks 20, 21 are loosely gathered or bent in a gap A (see FIG. 4) between the positive and negative electrodes 13, 14 and the disks 20, 21.

To provide the slack gathered, bent or loosened portion in the rectangular leads 11 in the gap A, a jig 40 (see FIG. 9A) may be pressed radially inwardly against the rectangular leads 11. Thereafter, the rectangular leads 11 may be welded to the outer circumferential surfaces of the disks 20a, 21a, as shown in FIG. 9B.

Alternatively, the rectangular leads 11, which are relatively long, may first be welded to the outer circumferential surfaces of the disks 20a, 21a, as shown in FIG. 10A, and then the rectangular leads 11 may be loosely gathered or bent radially inwardly by a jig 40 which is pressed against the rectangular leads 11, as shown in FIG. 10B.

As shown in FIGS. 3 and 4, the spirally coiled electrode assembly 35 thus welded, the positive terminal 20, and the negative terminal 21 are assembled together with backup rings 51, seals 8, ceramic abutments 6, caps 1, rings 50, and ceramic washers 5, which are thereafter fastened together by nuts 7 threaded over the studs 20b, 21b.

Thereafter, the spirally coiled electrode assembly 35 with the above various components assembled is covered with one to three layers of an insulating sheet of polyimide wound therearound. After the insulating sheet of polyimide is kept in position by an adhesive tape, the entire assembly is placed into the cylindrical casing 17.

At this time, as shown in FIG. 4, the cap 1 is pressed into an end of the cylindrical casing 17, and welded thereby by a laser beam. Specifically, the laser beam emitted toward an outer surface of the cap 1 pressed in the cylindrical casing 17 is applied to the outer edge of the cap 1 to weld and seal the cap 1.

Since the cap 1 is welded to the cylindrical casing 17 by a laser beam, the completed secondary battery is of a fully sealed structure.

The cylindrical casing 17 is made of stainless steel (SUS304) and has a wall thickness ranging from 0.3 to 0.5 mm. The cap 1 is also made of stainless steel (SUS304) and has a thickness of 3 mm.

As shown in FIGS. 3 and 4, the cylindrical studs 20b, 21b have their outer surfaces 15 externally threaded at M6. When the nuts 7 are threaded over the externally threaded outer surfaces 15, the caps 1 are clamped between the ceramic washers 5 and ceramic abutments 6, securing the positive and negative terminals 20, 21 to the caps 1. The seals 8, which are made of fluorine plastic, are sandwiched between the disks 20a, 21a and the caps 1 to prevent the nonaqueous electrolyte from leaking out of the cylindrical casing 17.

The cylindrical studs 20b, 21b have respective central axial holes defined therein which have inner surfaces 16 internally threaded at M6. The internally threaded inner surfaces 16 are used to connect the secondary battery to external wires. Specifically, bolts 19 are threaded into the internally threaded inner surfaces 16 to sandwich bus bars or conductors between the outer ends of the cylindrical studs 20b, 21b and the heads of the bolts 19.

The core 31 and the positive and negative terminals 20, 21 are electrically insulated from each other by insulating collars 12 of polypropylene (PP).

As shown in FIGS. 4 and 11, each of the ceramic washers 5 comprises a circular plate having a circular hole defined centrally therein, and is gripped between the nut 7 and the cap 1. The ceramic washers 5 are made of alumina ($Al_2O_3$). Because the ceramic washers 5 are made of alumina, they serve to electrically insulate the positive and negative terminals 20, 21 from the caps 1.

Inasmuch as the positive and negative terminals 20, 21 are fastened to the respective caps 1 by the tightened nuts 7, the ceramic washers 5 are required to be rigid enough to withstand the tightening forces, i.e., compressive forces, from the nuts 7. The ceramic washers 5 of alumina are capable of sufficiently withstanding the compressive forces from the nuts 7. The ceramic washers 5 of alumina can maintain the strong tightening forces as their shape remains unchanged over a long period of time after they are tightened. The ceramic washers 5 of alumina can also maintain the strong tightening forces in a wide range of temperatures because their rigidity does not change regardless of ambient temperature changes. Since the ceramic washers 5 of alumina are of very high rigidity, they can be strongly tightened by the nuts 7. As a result, the nuts 7 can be tightened with high tightening forces, will not be loosened by vibrations with time even when the secondary battery is used on an electric vehicle, and hence provide a sufficient sealing capability to prevent the nonaqueous electrolyte from leaking out of the secondary battery.

The rings 50 are positioned axially between the ceramic washers 5 and the ceramic abutments 6 and radially between the caps 1 and the studs 20*b*, 21*b*. The rings 50 have a rectangular cross-sectional shape and are made of a polymeric material such as polypropylene or the like. When the positive and negative terminals 20, 21 are fixed to the caps 1 by the nuts 7, the rings 50 serve to hold the central axis of the positive and negative terminals 20, 21 in alignment with the longitudinal axis of the secondary battery.

The ceramic abutments 6 are sandwiched between the inner surfaces of the caps 1 and the disks 20*a*, 21*a*. As with the ceramic washers 5, each of the ceramic abutments 6 comprises a circular plate having a circular hole defined centrally therein, and is made of alumina ($Al_2O_3$). The ceramic abutments 6 serve to electrically insulate the positive and negative terminals 20, 21 from the caps 1. The ceramic abutments 6 are capable of sufficiently withstanding compressive forces from the nuts 7, and can maintain strong tightening forces as their shape remains unchanged over a long period of time after they are tightened. The ceramic abutments 6 of alumina can also maintain the strong tightening forces in a wide range of temperatures because their rigidity does not change regardless of ambient temperature changes. Since the ceramic abutments 6 of alumina are of very high rigidity, they can be strongly tightened by the nuts 7. As a result, the nuts 7 can be tightened with high tightening forces, will not be loosened by vibrations with time even when the secondary battery is used on an electric vehicle, and hence provide a sufficient sealing capability to prevent the nonaqueous electrolyte from leaking out of the secondary battery.

The ceramic abutments 6 have their outer circumferential dimensions selected such that the seals 8 will not be elastically deformed beyond a certain extent. Therefore, the seals 8 are prevented from being unduly elastically deformed, and hence allowed to exert high repulsive forces in the axial directions of the positive and negative terminals 20, 21. As a consequence, the ceramic abutments 6 permit the seals 8 to have a sufficient sealing capability.

The backup rings 51, which are made of polypropylene, are mounted on the disks 20*a*, 21*a*, respectively, radially outwardly of the seals 8 in contact therewith. The backup rings 51 prevent the seals 8 from being unduly deformed when the seals 8 are contacted and swollen by the nonaqueous electrolyte contained in the cylindrical casing 17. Therefore, the backup rings 51 also prevent the seals 8 from reducing their repulsive forces in the axial directions of the positive and negative terminals 20, 21.

As shown in FIGS. 3, 4, and 11, gas release valves 9 are mounted on the respective caps 1 at an off-center position thereon. Specifically, the gas release valves 9 are threaded into off-center holes defined in the respective caps 1. The gas release valves 9 serve to release a gas out of the cylindrical casing 17 when a pressure buildup in the cylindrical casing 17 exceeds a predetermined pressure level.

Each of the gas release valves 9 comprises a valve body which is normally urged by a spring in a direction to close the off-center hole in the cap 1 for sealing the interior space in the cylindrical casing 17. If the pressure of a gas in the cylindrical casing 17 increases beyond the predetermined pressure level for some reason, the valve bodies of the gas release valves 9 are displaced outwardly under the pressure buildup against the bias of the springs, thereby opening the off-center holes. Therefore, the gas in the cylindrical casing 17 is discharged through the off-center holes and holes defined in side walls of the gas release valves 9 out of the cylindrical casing 17. Consequently, the gas release valves 9 prevent the pressure of the gas from increasing beyond the predetermined pressure level within the cylindrical casing 17.

The caps 1 have respective electrolyte inlet ports 32 defined in off-center positions thereon which is diametrically opposite to the gas release valve 9. After the secondary battery has been assembled, a nonaqueous electrolyte is introduced through the electrolyte inlet ports 32 into the cylindrical casing 17. After the nonaqueous electrolyte has been introduced, the electrolyte inlet ports 32 are closed off by respective blind plugs 4 that are threaded into the electrolyte inlet ports 32, thereby sealing the cylindrical casing 17. Metal seals 2 are disposed around the respective blind plugs 4 between the heads of the blind plugs 4 and the outer surfaces of the caps 1. Each of the metal seals 2 has a rectangular cross-sectional shape, and is made of pure aluminum. The caps 1 and the heads of the blind plugs 4 which are held in contact with the metal seals 2 are made of stainless steel (SUS304).

It has been confirmed that when stainless steel and pure aluminum are held in contact with each other and also with a nonaqueous electrolyte of a lithium ion secondary battery, the pure aluminum is corroded.

The metal seals 2 of pure aluminum are capable of blocking gases and water more effectively against passage therethrough and also of making the service life of the secondary battery longer than other seals of rubber or a polymeric material. Since pure aluminum is more durable than rubber or a polymeric material, the metal seals 2 can be used for a longer period of time, possibly semipermanently, than other seals of rubber or a polymeric material. Accordingly, it is not necessary to replace the metal seals 2 while the secondary battery is in usage.

Metal seals 3 which are used with the gas release valves 9 may also be made of pure aluminum.

A process of introducing a nonaqueous electrolyte into the cylindrical casing 17 will be described below.

The nonaqueous electrolyte to be introduced into the cylindrical casing 17 comprises a mixed solvent of propylene carbonate and diethyl carbonate and $LiPF_6$ dissolved in the mixed solvent at a ratio of 1 mol/l.

An attachment for introducing a nonaqueous electrolyte is threaded into one of the electrolyte inlet ports 32. The attachment is connected to an electrolyte tank through a pipe. A space above the level of the nonaqueous electrolyte contained in the electrolyte tank is connected through a directional control valve to a vacuum pump, which is also connected to the cylindrical casing 17.

When the vacuum pump is operated, the cylindrical casing 17 is evacuated to develop a negative pressure therein compared with the atmospheric pressure. Then, the directional control valve is operated to vent the space above the level of the nonaqueous electrolyte in the electrolyte tank to the atmosphere. Since the pressure in the electrolyte tank becomes higher than the pressure in the cylindrical casing 17, the nonaqueous electrolyte in the electrolyte tank is forced through the pipe and the attachment into the cylindrical casing 17.

The above cycle is repeated until the cylindrical casing 17 is filled up with the nonaqueous electrolyte from the electrolyte tank.

After the cylindrical casing 17 has been filled up with the nonaqueous electrolyte, the blind plug 4 is threaded into the electrolyte inlet port 32 through the metal seal 2, thereby sealing the cylindrical casing 17.

As shown in FIG. 11, the cap 11 which is combined with the positive terminal 20 has a cross sign 18 indicating that the stud 20b is connected to the positive terminal 20 or anode of the secondary battery. The cap 11 which is combined with the negative terminal 21 may also have a bar sign (not shown) indicating that the stud 21b is connected to the negative terminal 21 or cathode of the secondary battery.

FIGS. 12 through 16 show a cylindrical secondary battery according to another embodiment of the present invention.

Those parts of the cylindrical secondary battery shown in FIGS. 12 through 16 which are identical to those of the cylindrical secondary battery shown in FIGS. 3 through 11 are denoted by identical reference characters, and will not be described in detail below.

The cylindrical secondary battery shown in FIGS. 12 through 16 differs from the cylindrical secondary battery shown in FIGS. 3 through 11 in that each of the disks 20a, 20b has a circular pattern of gas release holes 23 defined therein and extending axially therethrough. Each of the disks 20a, 20b has a diameter of 54 mm and a thickness of 3.5 mm. Each of the gas release holes 23 has a diameter of 6 mm. The gas release holes 23 are positioned on a circle which is 44 mm spaced from the center of the disks 20a, 21a. In the illustrated embodiment, each of the disks 20a, 21a has eight gas release holes 23 angularly spaced at equal circumferential intervals (see FIG. 15).

Each of the insulating collars 12, which are positioned between the spirally coiled electrode assembly 35 and the positive and negative terminals 20, 21, also has gas release holes 24 (see FIG. 15) aligned with the respective gas release holes 23 in the disks 20a, 21a for passing therethrough a gas which may be present between the insulating collars 12 and the spirally coiled electrode assembly 35. Each of the gas release holes 24 has a diameter of 6 mm. The gas release holes 24 are positioned on a circle which is 44 mm spaced from the center of the insulating collars 12. In the illustrated embodiment, each of the insulating collars 12 has eight gas release holes 24 angularly spaced at equal circumferential intervals (see FIG. 15). The release holes 23, 24 are axially aligned with each other across contacting surfaces of the disks 20a, 21a and the insulating collars 12.

A gas which is generated in the cylindrical casing 17 is discharged through the gas release holes 23, 24 out of the cylindrical casing 17 as follows:

If the secondary battery suffers a malfunction due to a short circuit in a region 26 (see FIG. 12) between the positive and negative electrodes 13, 14, then the nonaqueous electrolyte in the cylindrical casing 17 is evaporated into a gas due to the Joule heat which is generated by the short circuit. The generated gas is apt to escape axially, rather than spirally, along the positive and negative electrodes 13, 14 as indicated by the arrows in FIG. 12, because the spiral passage along the positive and negative electrodes 13, 14 is long and poses a greater resistance to the flow of the gas.

The gas generated in the region 26 flows axially in the directions indicated by the arrows to the ends of the spirally coiled electrode assembly 35.

There are 50 or more leads 11 welded to the outer circumferential surface of each of the disks 20a, 21a. Since the leads 11 are thin and flexible, they flex upon a pressure buildup due to the gas generated in the cylindrical casing 17, and would otherwise prevent the gas from going radially outwardly between the leads 11 around the outer edges of the disks 20a, 21a.

Figure 16:
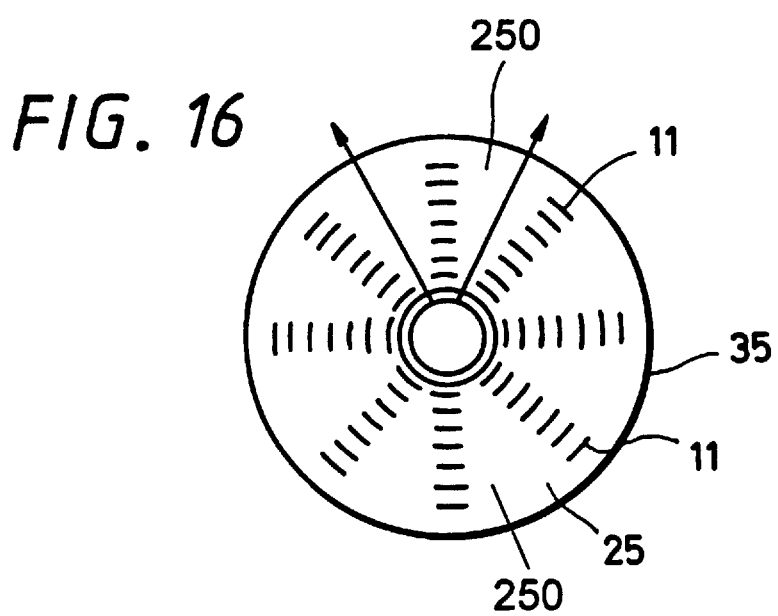
FIG. 16 is an end view of a spirally coiled electrode assembly of the cylindrical secondary battery shown in FIG. 12.

In the illustrated embodiment, the leads 11 are grouped into radially aligned sets which are circumferentially spaced, and welded to the disks 20a, 21a, leaving radial gas release spaces 250, as shown in FIG. 16. To group the leads 11 into those radially aligned sets which are circumferentially spaced, the spacings between the leads 11 have to be adjusted depending on the radiuses of the layers of the positive and negative electrodes 13, 14, and may not accurately be controlled due to possible thickness irregularities of the positive and negative electrodes 13, 14.

In addition to the gas release spaces 250, the gas release holes 23, 24 defined in the disks 20a, 21a and the insulating collars 12 provide an effective gas flow passage for releasing the gas generated in the cylindrical casing 12.

As shown in FIG. 12, the gas that has reached the ends of the spirally coiled electrode assembly 35 flows into spaces defined between the spirally coiled electrode assembly 35 and the insulating collars 12. The gas then flows substantially uniformly through the gas release passages 24 in the insulating collars 12 and then through the gas release passages 23 in the disks 20a, 21a.

The gas discharged from the gas release passages 23 then enters spaces defined between the disks 20a, 21a and the caps 1. The spaces defined between the disks 20a, 21a and the caps 1 and spaces defined between the cylindrical casing 17 and the holders 33 are contiguous to each other and jointly make up cylindrical spaces. Therefore, the discharged gas can freely move in the cylindrical spaces. The gas flowing in the cylindrical spaces can thus reach inlets of the gas release valves 9 each mounted on one of the caps 1.

The gas that enters the gas release valves 9 open the valve bodies thereof under the pressure of the gas, and is released through the gas release valves 9 from the cylindrical casing 17.

Figure 14:
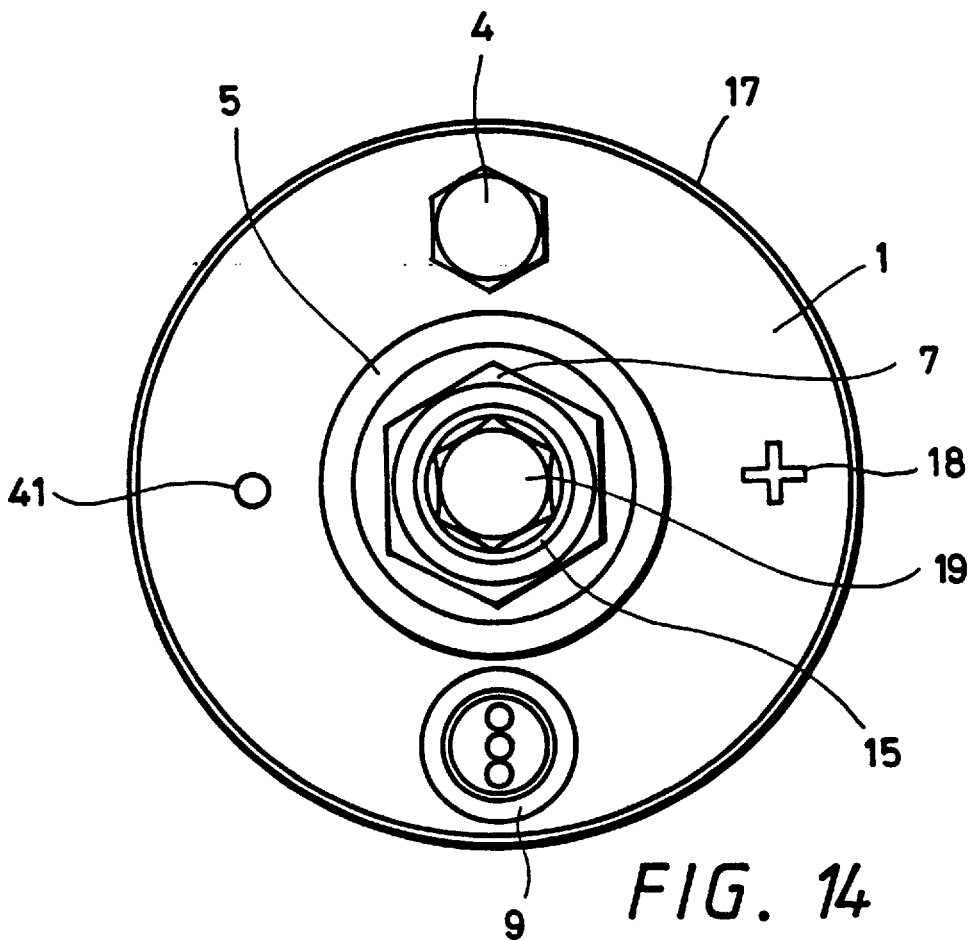
FIG. 14 is an enlarged elevational view of an end of the cylindrical secondary battery shown in FIG. 12.
Figure 15:
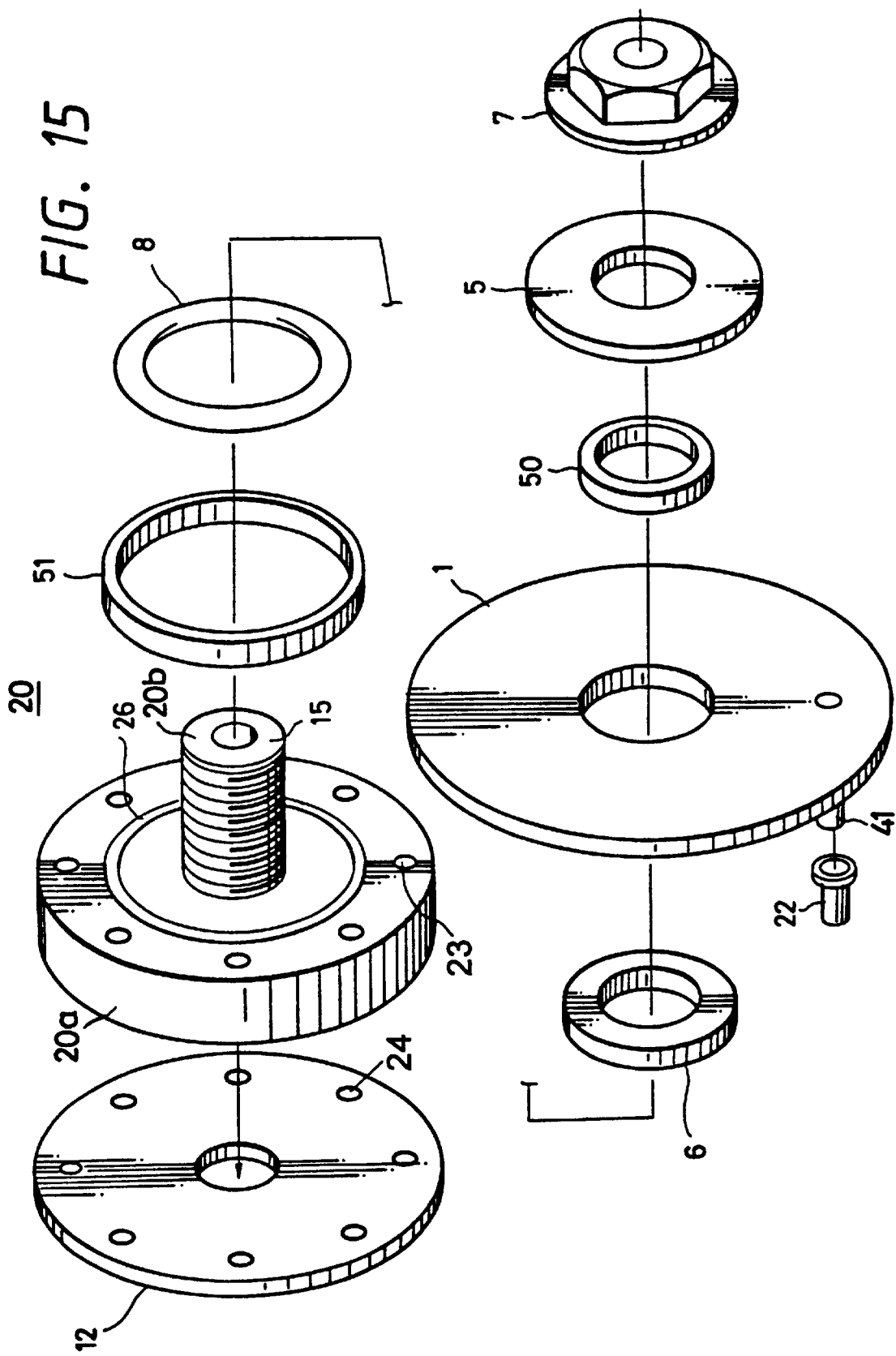
FIG. 15 is an enlarged exploded perspective view of an end of the cylindrical secondary battery shown in FIG. 12.

As shown in FIGS. 14 and 15, a stopper pin 41 fixed to each of the caps 1 is fitted in one of the gas release holes 23 defined in each of the disks 20a, 21a. The stopper 41 is made of stainless steel (SUS304).

When the positive and negative terminals 20, 21 are fastened to the cylindrical casing 17 by turning the nuts 7, if the positive and negative terminals 20, 21 were freely rotatable with respect to the caps 1, then the positive and negative terminals 20, 21 would be rotated in unison with the nuts 7 upon turning thereof. If the positive and negative terminals 20, 21 were rotated, then the ceramic washers 5, the rings 50, the ceramic abutments 6, and the backup rings 51 would also be rotated.

If the positive and negative terminals 20, 21 were rotated, then the seals 8 would be subjected to opposite frictional forces from the inner surfaces of the caps 1 and the outer surfaces of the disks 20a, 21a. Therefore, the opposite contact surfaces of the seals 8 would be worn by those opposite frictional forces, and the seals 8 would lose their original sealing capability.

If the positive and negative terminals 20, 21 were rotated, then they would impose a load on the rectangular leads 11, tending to twist the rectangular leads 11 until the rectangular leads 11 would be damaged.

When the bolts 19 are threaded into the internally threaded inner surfaces 16 and tightened to sandwich bus bars or conductors between the outer ends of the cylindrical studs 20b, 21b and the heads of the bolts 19, if the nuts 7 were not sufficiently tightened, then the positive and negative terminals 20, 21 would be rotated. Such rotation of the positive and negative terminals 20, 21 would also cause the above problems.

According to this embodiment, the stopper pin 41 mounted on each of the caps 1 is fitted in one of the gas release holes 23 and a corresponding one of the gas release holes 24.

The stopper pin 41 prevents the disks 20a, 21a from rotating when the positive and negative terminals 20, 21 are subjected to a torque by the tightening of the nuts 7 or the bolts 19. Therefore, the positive and negative terminals 20, 21 are not rotated when the nuts 7 or the bolts 19 are tightened.

The positive and negative terminals 20, 21, the insulating collars 12, and associated components are assembled as follows.

As shown in FIG. 15, a bump on the inner surface of each of the positive and negative terminals 20, 21 is fitted in a recess in the outer surface of the insulating collar 12, fixing the insulating collars 12 to the positive and negative terminals 20, 21. At this time, the gas release holes 23 in the disks 20a, 21a are held in axial alignment with the respective gas release holes 24 in the insulating collars 12. Then, the backup ring 51 is fitted into an annular groove 26 defined in the outer surface of each of the positive and negative terminals 20, 21. Thereafter, the seal 8 is placed within the backup ring 51 in contact with the outer surface of each of the disks 20a, 21a. The ceramic abutment 6 is placed in the seal 8 in contact with the outer surface of each of the disks 20a, 21a.

The stopper pin 41 is fitted in a hole defined in an off-center position in each of the caps 1, and welded thereto. An insulating collar 22, which is made of polypropylene, is then fitted over the stopper pin 41.

The cap 1 is placed on the each of the disks 20a, 21a with the backup ring 51, the seal 8, and the ceramic abutment 6 mounted thereon. At the same time, the stopper pin 41 surrounded by the insulating collar 22 is fitted into one of the gas release holes 23 defined in each of the disks 20a, 21a.

Then, the ring 50 is placed between the cap 1 and the externally threaded outer surface 15 of each of the studs 20b, 21b. The ceramic washer 5 is placed on the cap 1, and finally the nut 7 is threaded over the externally threaded outer surface 15 of each of the studs 20b, 21b.

In the embodiment shown in FIGS. 12 through 16, the gas release holes 23, 24 can quickly and smoothly guide the gas produced in the spirally coiled electrode assembly 35 to the inlets of the gas release valves 9.

Because the gas release holes 23, 24 are provided, the rectangular leads 11 are not required to be strictly grouped into radially aligned sets which are circumferentially spaced, but may rather be spaced at random. Accordingly, the positive and negative terminals 13, 14 may be manufactured for greater productivity without strict dimensional control.

Furthermore, the gas release holes 23 present in the disks 20a, 21a reduce the volume and hence weight of the positive and negative terminals 20, 21, resulting in a reduction in the overall weight of the secondary battery.

The gas release holes 23, 24 provide an additional passage for introducing the nonaqueous electrolyte into the cylindrical casing 17.

Figure 17:
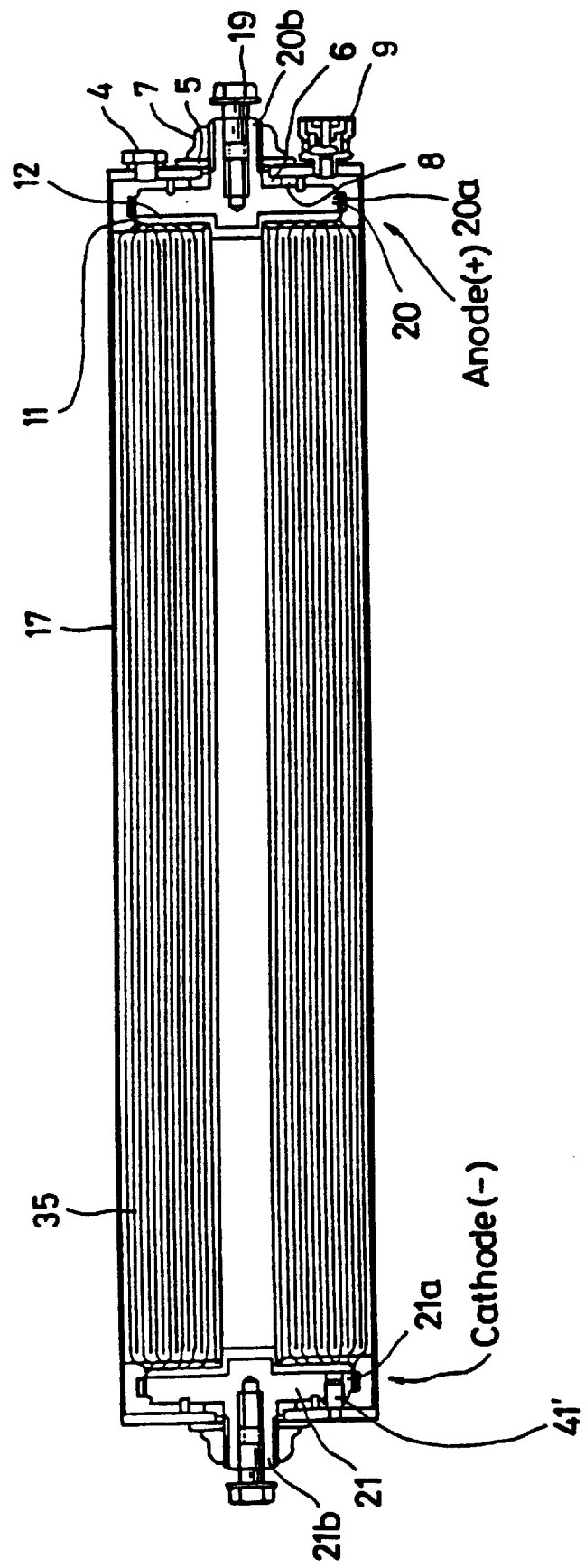
FIG. 17 is a longitudinal cross-sectional view of a cylindrical secondary battery according to still another embodiment of the present invention.
Figure 18:
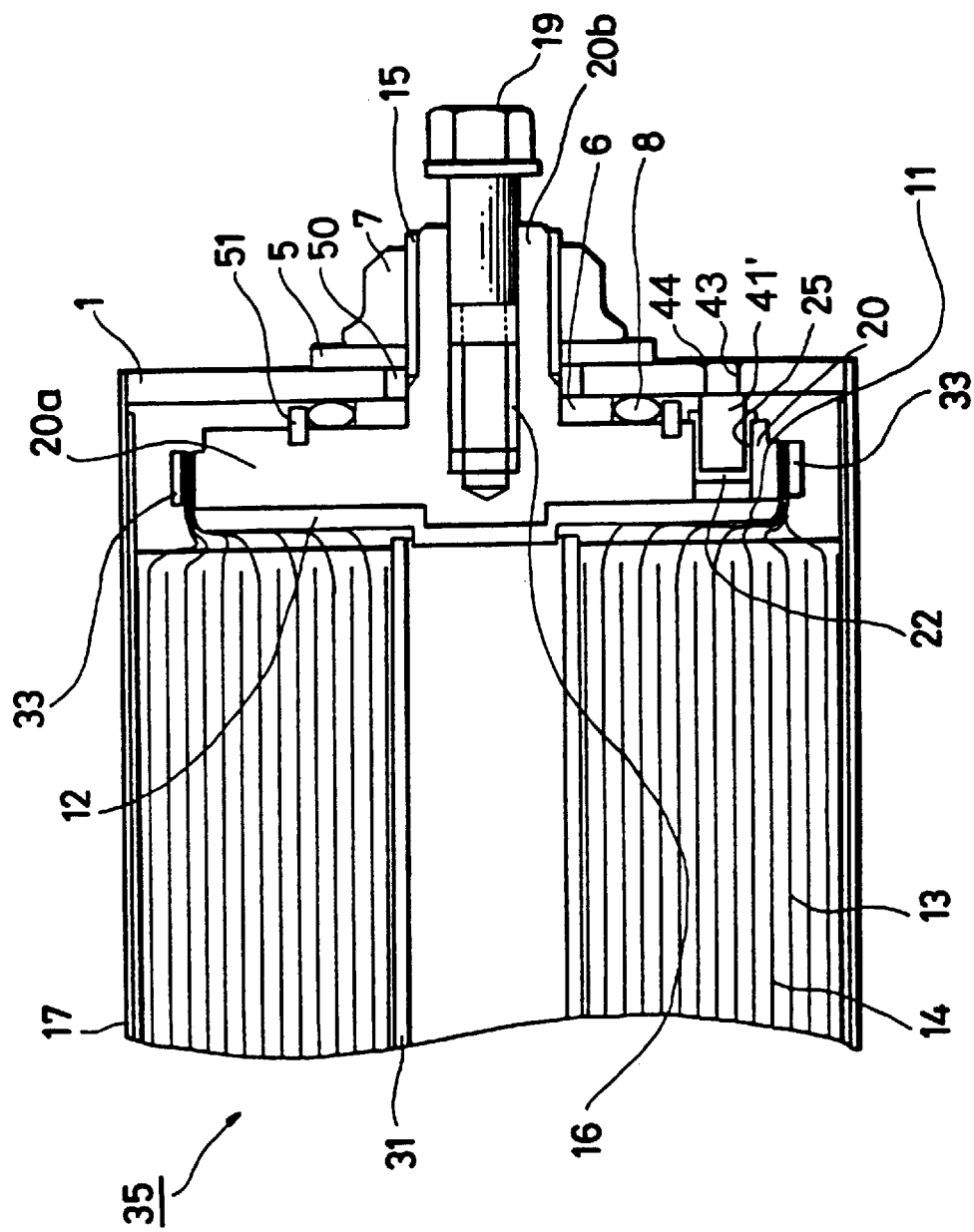
FIG. 18 is an enlarged partial cross-sectional view of one end of the cylindrical secondary battery shown in FIG. 17.
Figure 19:
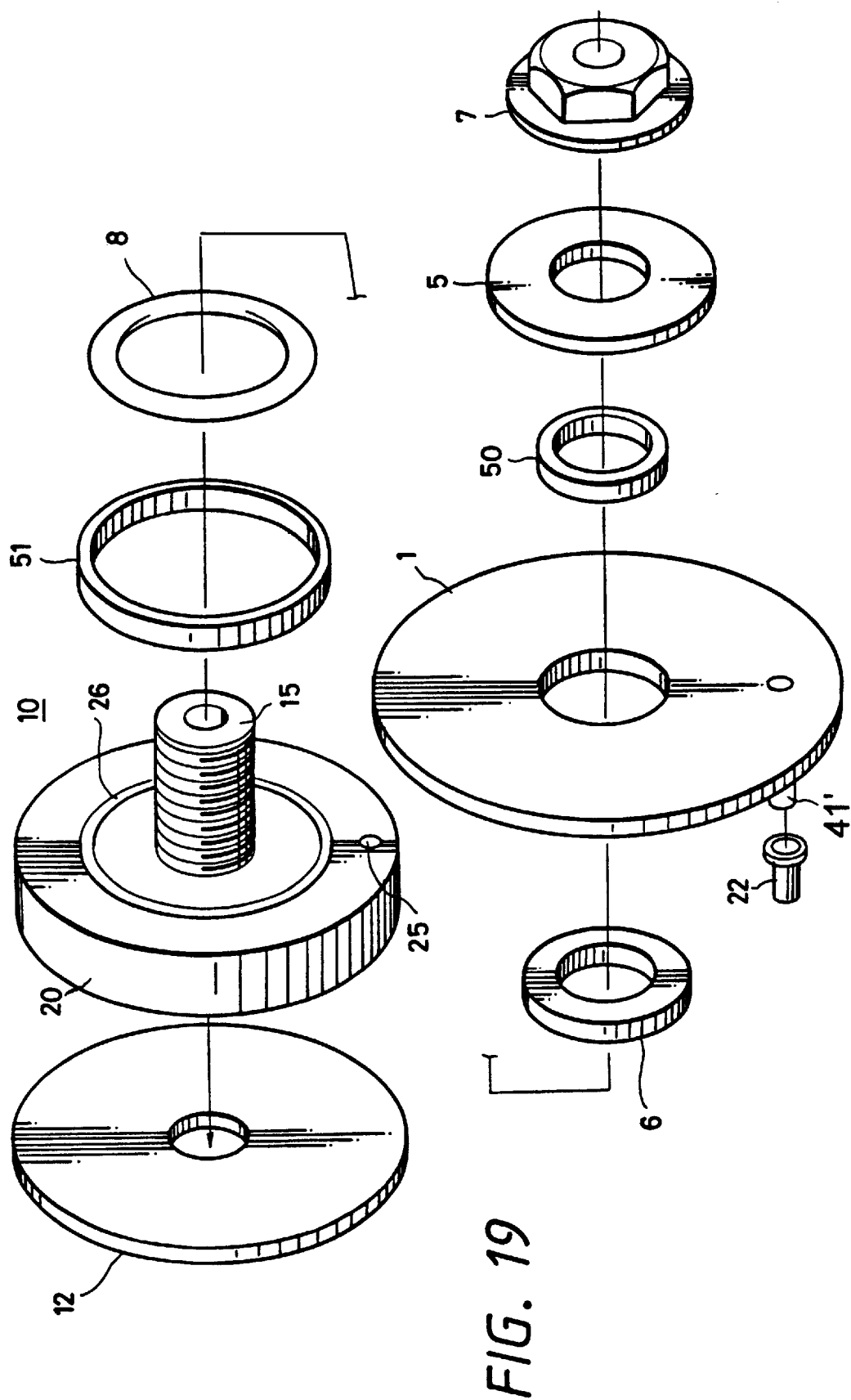
FIG. 19 is an enlarged exploded perspective view of an end of the cylindrical secondary battery shown in FIG. 17.

FIGS. 17 through 19 show a cylindrical secondary battery according to still another embodiment of the present invention.

The cylindrical secondary battery shown in FIGS. 17 through 19 differs from the cylindrical secondary battery shown in FIGS. 3 through 11 in that a stopper pin 41' is mounted on each of the caps 1 and fitted in a hole 25 defined in each of the disks 20a, 21a for preventing the positive and negative terminals 20, 21 from rotating when the nuts 7 or the bolts 19 are turned.

Specifically, as shown in FIG. 18, the stopper pin 41' is of a stepped cylindrical shape having a smaller-diameter portion and a larger-diameter portion. The smaller-diameter portion of the stopper pin 41' is fitted in a hole 43 defined in the cap 1, and has its outer end 44 welded to an outer circumferential edge of the hole 43.

An insulating collar 22 is fitted over the larger-diameter portion of the stopper pin 41' for electrically insulating the cap 1 from the disks 20a, 21a.

The stopper pin 41' is made of stainless steel (SUS304), and the insulating collar 22 is made of polypropylene. The insulating collar 22 fitted over the larger-diameter portion of the stopper pin 41' is fitted in a hole 25 which is defined in the disks 20a, 21a at an off-center position thereon.

The stopper pin 41' prevents the disks 20a, 21a from rotating when the positive and negative terminals 20, 21 are subjected to a torque by the tightening of the nuts 7 or the bolts 19. Therefore, the positive and negative terminals 20, 21 are not rotated when the nuts 7 or the bolts 19 are tightened.

The positive and negative terminals 20, 21, the insulating collars 12, and associated components shown in FIG. 19 are assembled substantially in the same manner as shown in FIG. 15.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A cylindrical secondary battery comprising a positive and a negative electrode, each electrode having a collector coated with an active material on opposite surfaces and a plurality of rectangular leads extending from one edge, said electrodes being wound with separators to form a spirally coiled electrode assembly having the electrodes spaced from each other by one of the separators and having leads for one electrode extending from one end and leads for the other electrode extending from another end of the assembly;

positive and negative terminals secured to said rectangular leads extending from the respective opposite ends of the assembly;

a cylindrical casing housing said spirally coiled electrode assembly, said rectangular leads, and said positive and negative terminals; and a pair of caps mounted on respective opposite ends of said cylindrical casing, and said positive and negative terminals being fixed to a respective cap.

2. A cylindrical secondary battery according to claim 1, wherein each of said positive and negative terminals has a disk, said rectangular leads being secure to a periphery of said disk.

3. A cylindrical secondary battery according to claim 2, wherein said positive and negative terminals are secure to said rectangular leads by laser beam welding.

4. A cylindrical secondary battery according to claim 2, wherein said positive and negative terminals are secure to said rectangular leads by ultrasonic welding.

5. A cylindrical secondary battery according to claim 1, which includes at least one of said caps having a gas release valve.

6. A cylindrical secondary battery according to claim 1, wherein each of said positive and negative terminals has a disk, said rectangular leads being welded to a periphery of the disk and each disk being fixed to the cap by a stopper pin.

7. A cylindrical secondary battery according to claim 6, wherein each disk has an axially extending stud with external threads, each cap having an opening receiving the stud and being fixed to the terminal by a nut received on the external threads of the stud, each disk having a hole off-center of the stud receiving part of the stopper pin.

8. A cylindrical secondary battery comprising:
a terminal having a disk and a stud projecting axially from said disk, said disk having an off-center hole defined therein, said stud having an externally threaded surface and an internally threaded central hole;
a cap fastened between said disk and a nut which is threaded over said externally threaded surface;
a bolt threaded into said internally threaded central hole for sandwiching a conductor between a head of the bolt and an end of said stud;
a stopper pin having an end portion fixed to said cap and an opposite end portion fitted in said off-center hole in said disk; and
an insulating collar fitted over said opposite end portion of said stopper pin for electrically insulating said cap from said disk.

9. A cylindrical secondary battery comprising a positive and a negative electrode, each electrode having a collector coated with an active material on opposite surfaces and a plurality of leads extending from one edge, said electrodes being wound with separators to form a spirally coiled electrode assembly having the electrodes spaced from each other by one of the separators and having leads for one electrode extending from one end of the assembly and leads for the other electrode extending from another end of the assembly;
positive and negative terminals secured to said leads extending from the respective opposite ends of the assembly with each lead having a bent portion;
a cylindrical casing housing said spirally coiled electrode assembly, said rectangular leads, and said positive and negative terminals; and
a pair of caps mounted on respective opposite ends of said cylindrical casing, and said positive and negative terminals being fixed to a respective cap.

10. A cylindrical secondary battery according to claim 9, wherein said leads comprise a plurality of rectangular leads spaced at a predetermined interval.

11. A cylindrical secondary battery according to claim 9, which includes at least one of said caps having a gas release valve.

12. A cylindrical secondary battery comprising a positive and a negative electrode, each electrode having a collector coated with an active material on opposite surfaces and a plurality of leads extending from one edge, said electrodes being wound with separators on a core to form a spirally coiled electrode assembly having the electrodes spaced from each other by one of the separators and having leads for one electrode extending from one end of the assembly and leads for the other electrode extending from another end of the assembly;
positive and negative terminals, each terminal being a disk having gas release holes, said lead being welded to an outer circumferential surface of the respective disk;
an insulating collar between each disk and an end of the core for electrically insulating the core from said disk, each collar having gas release holes aligned with the holes of the disk;
positive and negative terminals secured to said rectangular leads extending from the respective opposite ends of the assembly;
a cylindrical casing housing said spirally coiled electrode assembly, said rectangular leads, said collars and said positive and negative terminals; and
a pair of caps mounted on respective opposite ends of said cylindrical casing, and said positive and negative terminals being fixed to a respective cap.

13. A cylindrical secondary battery according to claim 12, wherein said leads comprise rectangular leads.

14. A cylindrical secondary battery according to claim 12, wherein said gas release holes are defined in each of said disks around a central axis thereof at equally angularly spaced intervals.

15. A cylindrical secondary battery according to claim 12, wherein said leads have a predetermined bent portion.

16. A cylindrical secondary battery according to claim 12, which includes at least one of said caps having a gas release valve.

17. A cylindrical secondary battery comprising a positive and a negative electrode, each electrode having a collector coated with an active material on opposite surfaces and a plurality of leads extending from one edge, said electrodes being wound with separators to form a spirally coiled electrode assembly having the electrodes spaced from each other by one of the separators and having leads for one electrode extending from one end of the assembly and leads for the other electrode extending from another end of the assembly;
positive and negative terminals secured to said leads extending from the respective opposite ends of the assembly;
a cylindrical casing housing said spirally coiled electrode assembly, said rectangular leads, and said positive and negative terminals;
a pair of caps mounted on respective opposite ends of said cylindrical casing, and said positive and negative terminals being fixed to a respective cap;
each of said positive and negative terminals having a disk and a stud projecting axially from said disk, said disk having an off-center hole defined therein, said stud having an externally threaded surface and an internally threaded central hole;
each of said caps being fastened between said disk and a nut which is threaded over said externally threaded surface;
a bolt threaded into said internally threaded central hole for sandwiching a conductor between a head of the bolt and an end of said stud;

a stopper pin having an end portion fixed to each of said caps and an opposite end portion fitted in said off-center hole in said disk; and an insulating collar fitted over said opposite end portion of said stopper pin for electrically insulating said cap from said disk.

18. A cylindrical secondary battery according to claim 17, wherein said leads comprise rectangular leads.

19. A cylindrical secondary battery according to claim 17, which includes at least one of said caps having a gas release valve.

20. A cylindrical secondary battery according to claim 17, wherein each of said leads has a bent portion.

* * * * *